(12) United States Patent
Kuffner et al.

(10) Patent No.: US 12,550,834 B2
(45) Date of Patent: Feb. 17, 2026

(54) AUTONOMOUS WALL MOUNTED GARDEN

(71) Applicant: R&R Garden Company, Los Angeles, CA (US)

(72) Inventors: Riley Kuffner, Los Angeles, CA (US); Randall Shapiro, Los Angeles, CA (US); Rashed Alkhlaifat, Los Angeles, CA (US); Brian Frost, Los Angeles, CA (US); Alexander Rodriguez, Los Angeles, CA (US); Simon Lancaster, Los Angeles, CA (US); Michael Beadle, Los Angeles, CA (US); Vaibhav Gupta, Los Angeles, CA (US)

(73) Assignee: R&R Garden Company, Los Angeles, CA (US)

( * ) Notice: Subject to any disclaimer, the term of this patent is extended or adjusted under 35 U.S.C. 154(b) by 0 days.

(21) Appl. No.: 17/952,711

(22) Filed: Sep. 26, 2022

(65) Prior Publication Data

US 2023/0095718 A1   Mar. 30, 2023

Related U.S. Application Data

(60) Provisional application No. 63/248,138, filed on Sep. 24, 2021.

(51) Int. Cl.
*A01G 9/24* (2006.01)

(52) U.S. Cl.
CPC ............ *A01G 9/247* (2013.01); *A01G 9/246* (2013.01); *A01G 9/249* (2019.05)

(58) Field of Classification Search
USPC .... 47/65.9, 62 R, 59 R, 65, 65.5, 82, 83, 79
See application file for complete search history.

(56) References Cited

U.S. PATENT DOCUMENTS

| | | |
|---|---|---|
| 4,875,497 A | 10/1989 | Worthington |
| 4,982,606 A | 1/1991 | Adamski et al. |
| 5,145,323 A | 9/1992 | Farr |
| 5,590,490 A | 1/1997 | Kikuchi |
| 7,559,173 B2 | 7/2009 | Brusatore |
| D651,575 S | 1/2012 | Feldstein et al. |
| D653,162 S | 1/2012 | Moore et al. |

(Continued)

FOREIGN PATENT DOCUMENTS

| | | |
|---|---|---|
| AU | 2018201822 B2 | 4/2018 |
| CA | 2673783 C | 7/2008 |

(Continued)

OTHER PUBLICATIONS

Remy Chan, "Garden Automation", https://remychan.com/2016/11/09/garden-automation/ Nov. 9, 2016.

(Continued)

*Primary Examiner* — Andrea M Valenti
(74) *Attorney, Agent, or Firm* — Chiara F. Orsini; David G. Oberdick

(57) ABSTRACT

The invention is an autonomous wall garden system containing removeable trays, a water delivery system, a tray water level sensor system, and optional grow lights and user interface. The present invention provides a vertical plant growing environment that can be configured to monitor and, in certain cases automatically provide, the appropriate light, temperature, humidity and water for the specific plants in the garden.

14 Claims, 24 Drawing Sheets

(56) References Cited

U.S. PATENT DOCUMENTS

| | | | |
|---|---|---|---|
| 8,261,486 B2 | 9/2012 | Bissonnette et al. | |
| 9,476,752 B2 | 10/2016 | Vilag et al. | |
| 9,856,634 B2 | 1/2018 | Rodenbeck et al. | |
| 9,930,980 B2 | 4/2018 | Pau | |
| 10,383,292 B2 | 8/2019 | Jollie | |
| 11,140,835 B2 * | 10/2021 | Gartland | A01G 27/003 |
| 2008/0276534 A1 * | 11/2008 | Bissonnette | A01G 31/00 47/62 R |
| 2009/0158841 A1 | 6/2009 | Winkens | |
| 2012/0290227 A1 | 11/2012 | Estrada | |
| 2016/0278373 A1 | 9/2016 | Awada et al. | |
| 2016/0348681 A1 | 12/2016 | Le et al. | |
| 2019/0075741 A1 * | 3/2019 | Olesen | A01G 27/003 |
| 2019/0134561 A1 * | 5/2019 | Cavote | A01G 9/025 |
| 2020/0037514 A1 | 2/2020 | Massey | |
| 2021/0105954 A1 * | 4/2021 | Cardenas | A01G 9/025 |

FOREIGN PATENT DOCUMENTS

| | | | | |
|---|---|---|---|---|
| CA | 2633128 C | | 1/2014 | |
| CN | 1282631 C | | 11/2006 | |
| CN | 1835759 B | | 5/2012 | |
| CN | 202329746 U | | 7/2012 | |
| CN | 203239588 U | | 10/2013 | |
| CN | 206948986 | * | 2/2018 | Y02P 60/12 |
| CN | 209002535 | * | 6/2019 | A01G 27/00 |
| CN | 104114020 B | | 7/2019 | |
| EP | 3077582 A1 | | 10/2016 | |
| JP | H08275693 | * | 10/1996 | A01K 63/00 |
| JP | 2007174965 | * | 7/2007 | Y02A 40/25 |
| KR | 100860638 | * | 9/2008 | A01G 9/025 |
| KR | 20110109615 A5 | | 10/2011 | |
| KR | 20130102449 | * | 9/2013 | A01G 9/025 |
| KR | 20130007485 | * | 12/2013 | A01G 9/024 |
| KR | 101403740 B1 | * | 6/2014 | A01G 9/025 |
| KR | 20160002513 | * | 7/2016 | A01G 9/025 |
| KR | 102036180 | * | 10/2019 | C05F 11/08 |
| WO | WO2013182416 | * | 12/2013 | A01G 9/025 |
| WO | WO-2019157598 A1 | * | 8/2019 | A01G 7/045 |

OTHER PUBLICATIONS

Makerguides, "Automatic plant watering system with Arduino IoT Cloud", https://www.makerguides.com/automatic-plant-watering-system-with-arduino-iot-cloud/ Jun. 14, 2020.

* cited by examiner

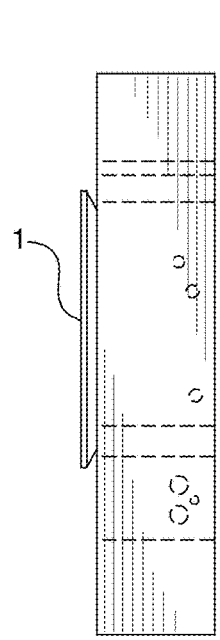
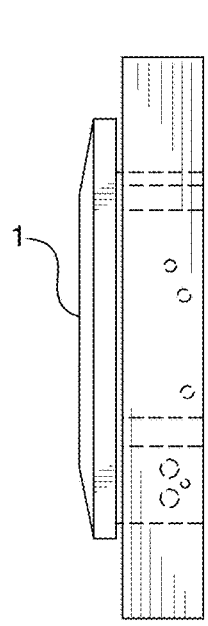
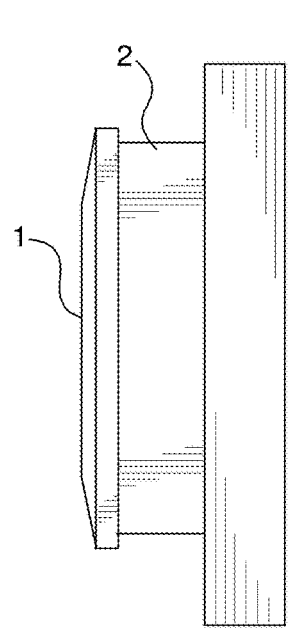
FIG. 6A        FIG. 6B        FIG. 6C
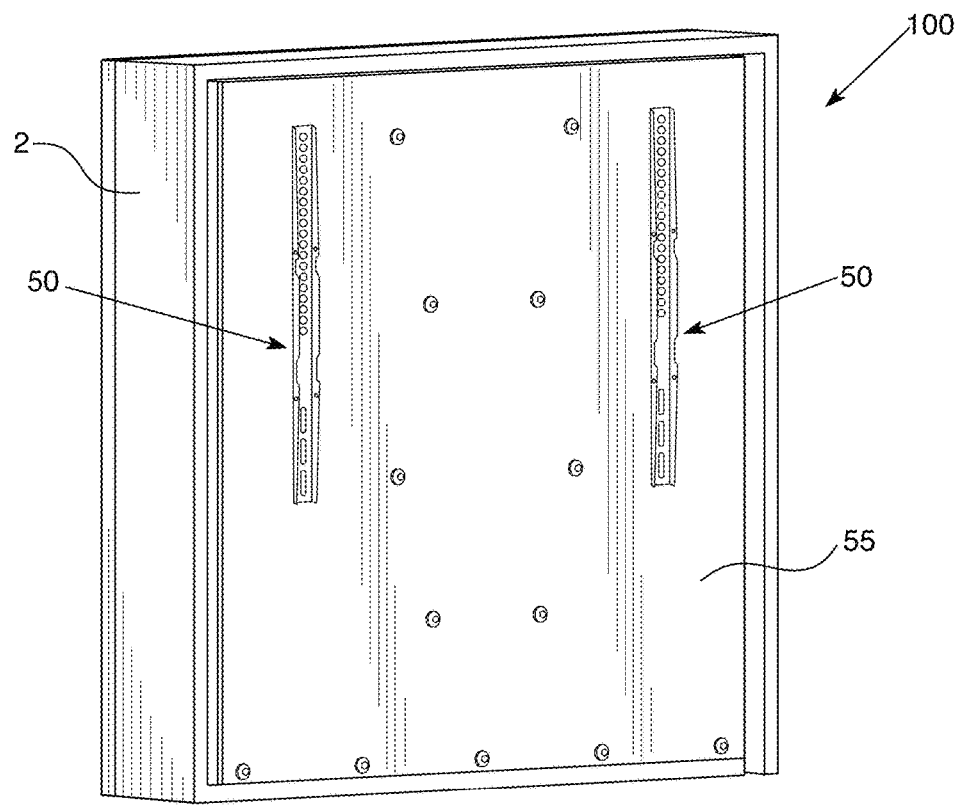
FIG. 6D

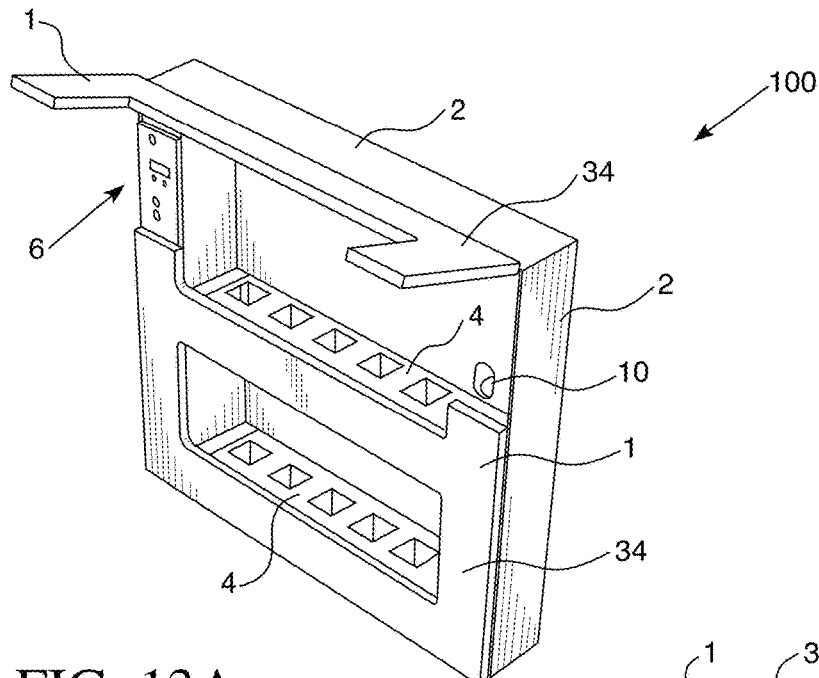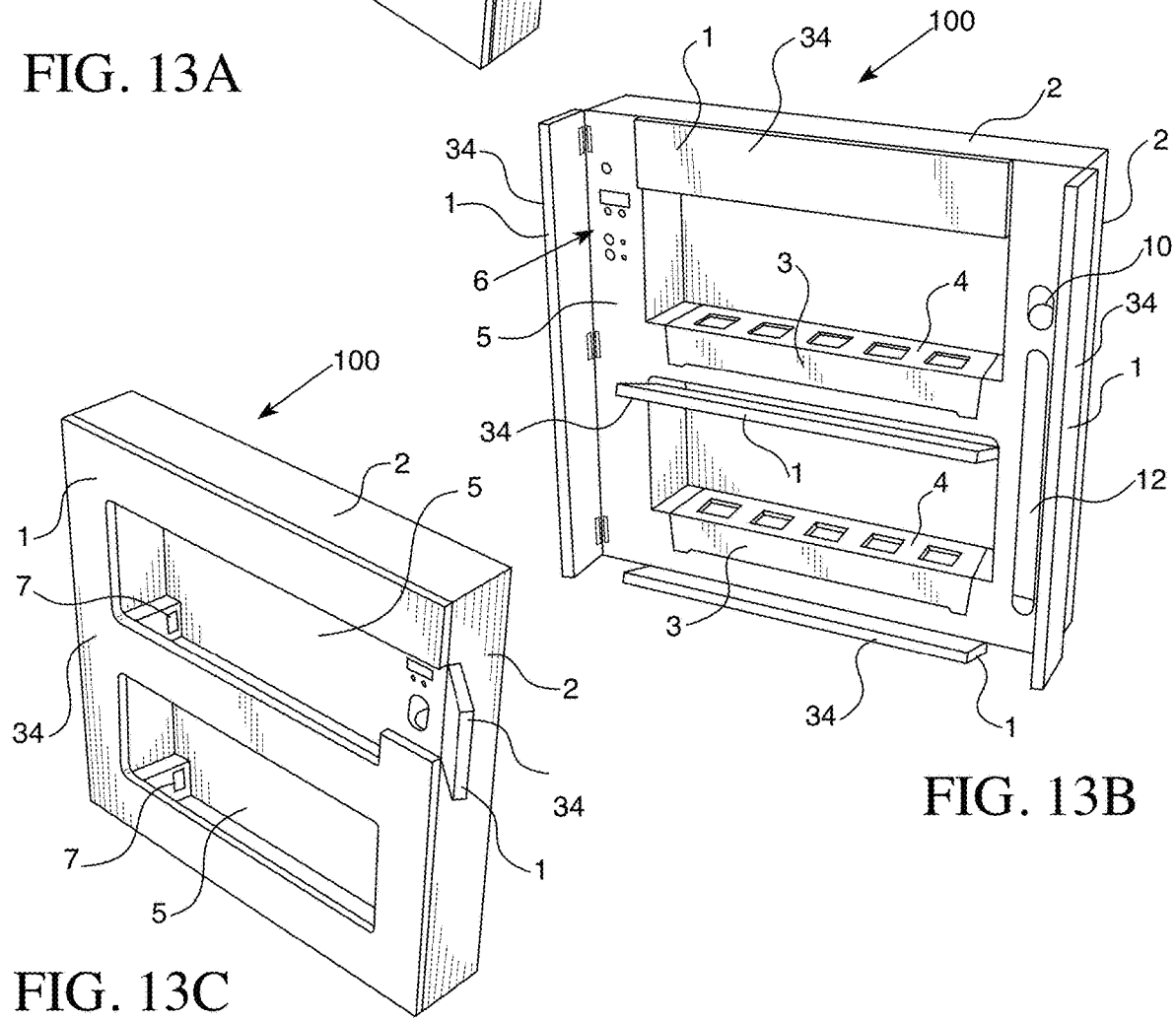
FIG. 13A
FIG. 13B
FIG. 13C

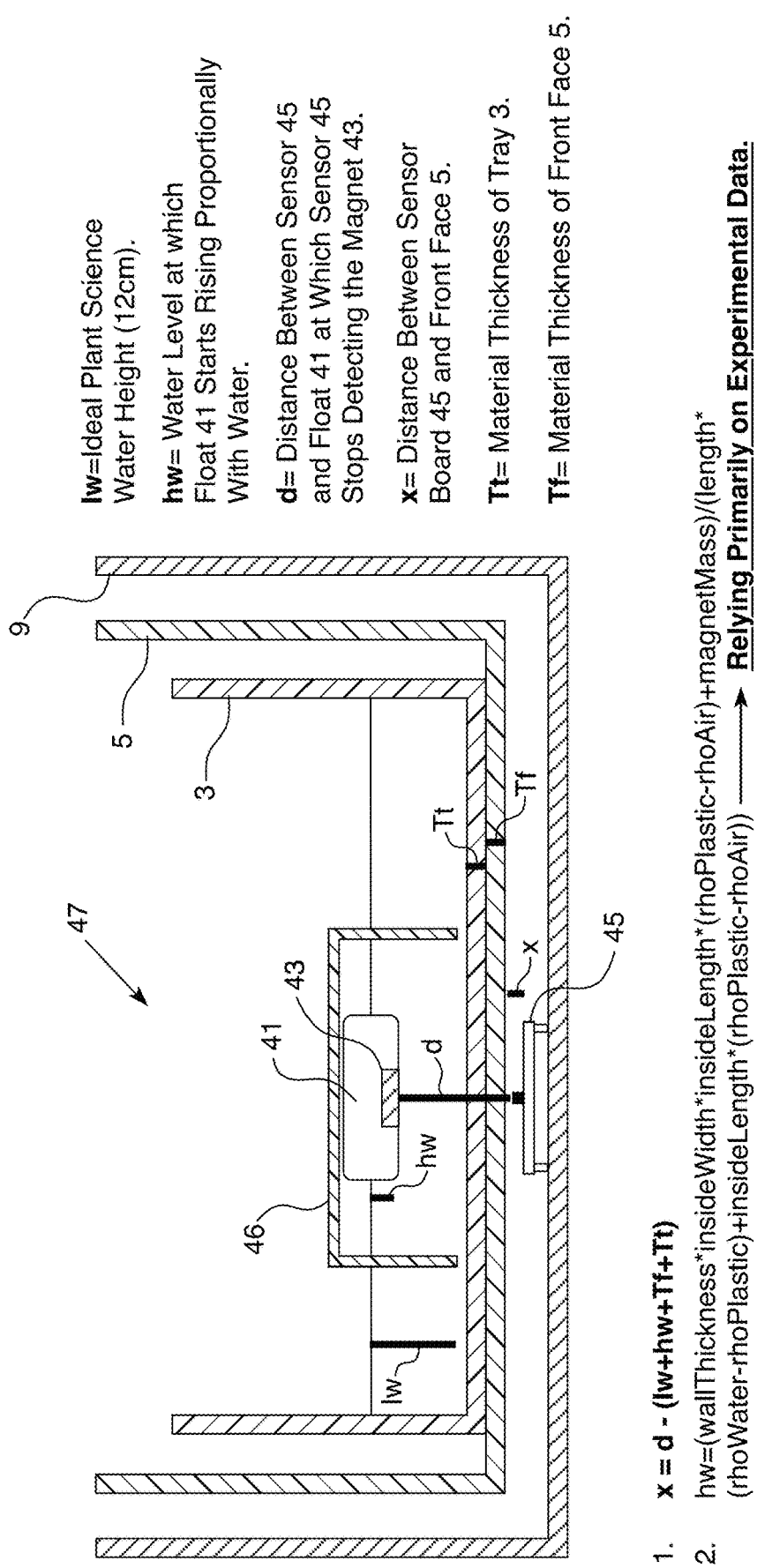

lw=Ideal Plant Science Water Height (12cm).

hw= Water Level at which Float 41 Starts Rising Proportionally With Water.

d= Distance Between Sensor 45 and Float 41 at Which Sensor 45 Stops Detecting the Magnet 43.

x= Distance Between Sensor Board 45 and Front Face 5.

Tt= Material Thickness of Tray 3.

Tf= Material Thickness of Front Face 5.

1. x = d - (lw+hw+Tf+Tt)
2. hw=(wallThickness*insideWidth*insideLength*(rhoPlastic-rhoAir)+magnetMass)/(length*(rhoWater-rhoPlastic)+insideLength*(rhoPlastic-rhoAir))  ⟶ Relying Primarily on Experimental Data.

FIG. 18

AUTONOMOUS WALL MOUNTED GARDEN

CROSS-REFERENCE TO RELATED APPLICATION

This application claims priority to U.S. Provisional Application Ser. No. 63/248,138, filed on Sep. 24, 2021, which application is incorporated by reference herein in its entirety.

BACKGROUND OF THE INVENTION

As of 2021, the global food system is at a critical stage. Approximately 265 million people are threatened by famine, up 50% on the year before. Seven hundred million people are suffering from chronic hunger. Two billion more people are suffering from malnutrition, with diet-related diseases becoming more prevalent throughout all regions in the world. The COVID-19 pandemic exacerbated these issues in the short term and, looking forward, people's conditions do not show signs of improving without systematic changes to the food system. According to estimates by the United Nations Food and Agriculture Organization, the world will need to produce 60% more food to feed a global population of 9.3 billion individuals by 2050. Given the fragile state of our environment with increasing climate disruption in all geographic areas, this cannot be addressed with conventional agricultural practices. It would take too heavy a toll on Earth's natural resources. Presently, global agriculture is already responsible for one third of all human caused greenhouse gas emissions. Thus, the world has no choice but to embark, in the words of the late American scientist and inventor, Buckminster Fuller, on a "design science revolution" to optimize planetary resources for the benefit of 100% of humanity and develop sustainable food production technologies.

Looking at the current state of global agriculture, the truth is that enough food is already being produced to feed the world, but it is not being distributed in an equitable manner to different regions, countries, households, and individuals. There are political factors at play, but from a technological perspective, this is primarily due to the inherent waste involved with conventional agriculture, namely, growing food (a perishable good) on farms in centralized locations far away from where the majority of people live. Roughly one-third of all the food produced in the world each year, approximately 1.3 billion tons, is lost or wasted. This happens throughout the supply chain from initial harvest all the way to final household consumption. In addition to leaving people in the world suffering, food that never gets eaten represents wasted resources including land, water, and energy, which contributes to increasing degradation of our environment, not to mention lost time of human workers that could otherwise be directed with limitless potential.

Given that a core issue with our global food system is distribution, the solution lies in decentralizing production, bringing people closer to their food to simplify the supply chain, reduce waste, and maximize resource efficiency. Some companies in developed economies have been working on this by creating vertical farms that exist in urban areas and produce food much more locally than conventional agriculture. These farms are based on hydroponics technology, which typically involves a controlled environment with artificial lighting, regulated irrigation, soilless growth media, and specially dosed inorganic fertilizers. Major benefits of these systems are that they use significantly less land and water than conventional farming, however, there are also critical issues. When it comes to delivering to customers, these centralized vertical farms are dependent upon the same distribution networks as the rest of our food system. Produce is sold to grocery stores or restaurants before eventually making it to the end consumer. Although the supply chain is shortened, there is still a significant amount of waste in this process. Further, agriculture is a historically low margin business, after all, an affordable cost of healthy food is crucial for society, but this means more pressure is put on the vertical farms. They are also very capital intensive to set up, and factors such as higher cost of rent and labor in cities do not help operating expenses. All of this makes vertical farming a very tough business from a cash flow perspective, and, at the end of the day, these companies are competing head-to-head against conventional agriculture because they sell the exact same product through the same distribution channels.

Recently, other companies in these developed economies have begun to advance the solution one step further, creating technology that enables on-site food production in homes, restaurants, and other places within our everyday environment. Instead of selling produce they are selling products. It is the ultimate decentralization of agriculture, completely breaking down the supply chain so fresh food is available at the same site at which it is being consumed, but this comes with a new set of challenges. There are two main categories of on-site food production devices, systems intended for commercial and for consumer use. On the commercial side, there are typically large shelf structures or cylindrical towers that can reliably grow a significant amount of produce. However, these devices are very expensive due to manufacturing inefficiencies and, since they are deployed on-site, they must meet the aesthetic expectations of customers as well as the operational needs of businesses. Unfortunately, current solutions on the market fall short in both areas. These products are bulky and have obtrusive looking materials, being designed almost exclusively around functionality, rather than fitting seamlessly into the environment. They are also difficult to maintain with multiple steps involved in the growing process and labor-intensive cleaning routines.

On the consumer side, companies are either coming out with small-scale systems designed for use on the countertop or smaller versions of the commercial shelves and towers focused on yield. These latter devices run into the same issues as their commercial counterparts, they are too expensive and require too much work to operate. The smaller products made for the countertop are affordable due to improvements in manufacturability and they bring advantages in automating the growth process, but these devices are bulky given their intended location, do not produce very much food, have lengthy cleaning procedures, and are made of cheap materials, falling short of the design aesthetic expected in most homes and apartments. As a result, none of these companies on the commercial or consumer sides of the business have gained significant traction in the market. They are missing true product-market fit, and, thus, are not the technological or social catalysts needed to popularize decentralized production and solve the core issues in our global food system.

Despite problems with current products, the presence of a growing business ecosystem centered around sustainable food shows that there is a market demand for this technology, in addition to the social and environmental demands of our planet. This is largely due to a growing consciousness that decentralization brings vast improvements in the health and quality of produce, as well as limiting the negative externalities present in conventional agriculture. After examining the current solutions, it is clear there is a need for an on-site food production device that seamlessly integrates into the aesthetic of our everyday environment, is fully automated, easy to clean, yield-focused, cost-effective, and can service both commercial businesses and consumers.

BRIEF SUMMARY OF THE INVENTION

The present invention is a wall garden system and a method of using a wall garden system that comprises, in one preferred embodiment, an at least three-sided structural frame that is configured to provide structure and support for the wall garden system. In other embodiments, the frame can be curved in whole or in part such that the frame can have various geometric shapes, including, without limitation, a circle, half-circle, oval and other shapes. A front face insert attaches within the structural frame and at least one shelf is either attached to or incorporated into the front face insert. The wall garden system includes at least one plant tray having one or more sides and a bottom. The plant tray is configured to sit on the at least one shelf and within the front face insert and is configured to hold an at least one plant growing system and an amount of water. The wall garden system also comprises at least one tray water level sensor system configured to measure the amount of water in the at least one tray and a water delivery system configured to deliver water to the at least one tray. A microprocessor or microcontroller unit controls the at least one tray water level sensor system and the water delivery system. Finally, the wall garden system includes a power source.

Another embodiment of the present invention is directed to a plant tray having at least one side forming various geometric shapes and a bottom to which the at least one side connects to form a container capable of holding water and at least one plant. By way of example, but not limitation, the container, from a top-down view, can have the shape of a rectangle, triangle, pentagon, octagon, circle, half-circle or oval. The plant trays of this invention incorporate at least one component to enable the amount of water in the plant tray to be determined.

BRIEF DESCRIPTION OF DRAWINGS OF INVENTION

For the purpose of facilitating understanding of the invention, the accompanying drawings and description illustrate preferred embodiments thereof, from which the invention, various embodiments of its structures, construction and method of operation, and many advantages, may be understood and appreciated. The accompanying drawings are hereby incorporated by reference.

FIGS. 6A through 6D illustrate various possible installation arrangements for different embodiments of the present invention;

FIGS. 13A through 13C show alternate embodiments of the front exterior casing, which contain a variety of movable casing sections;

Figure 19:
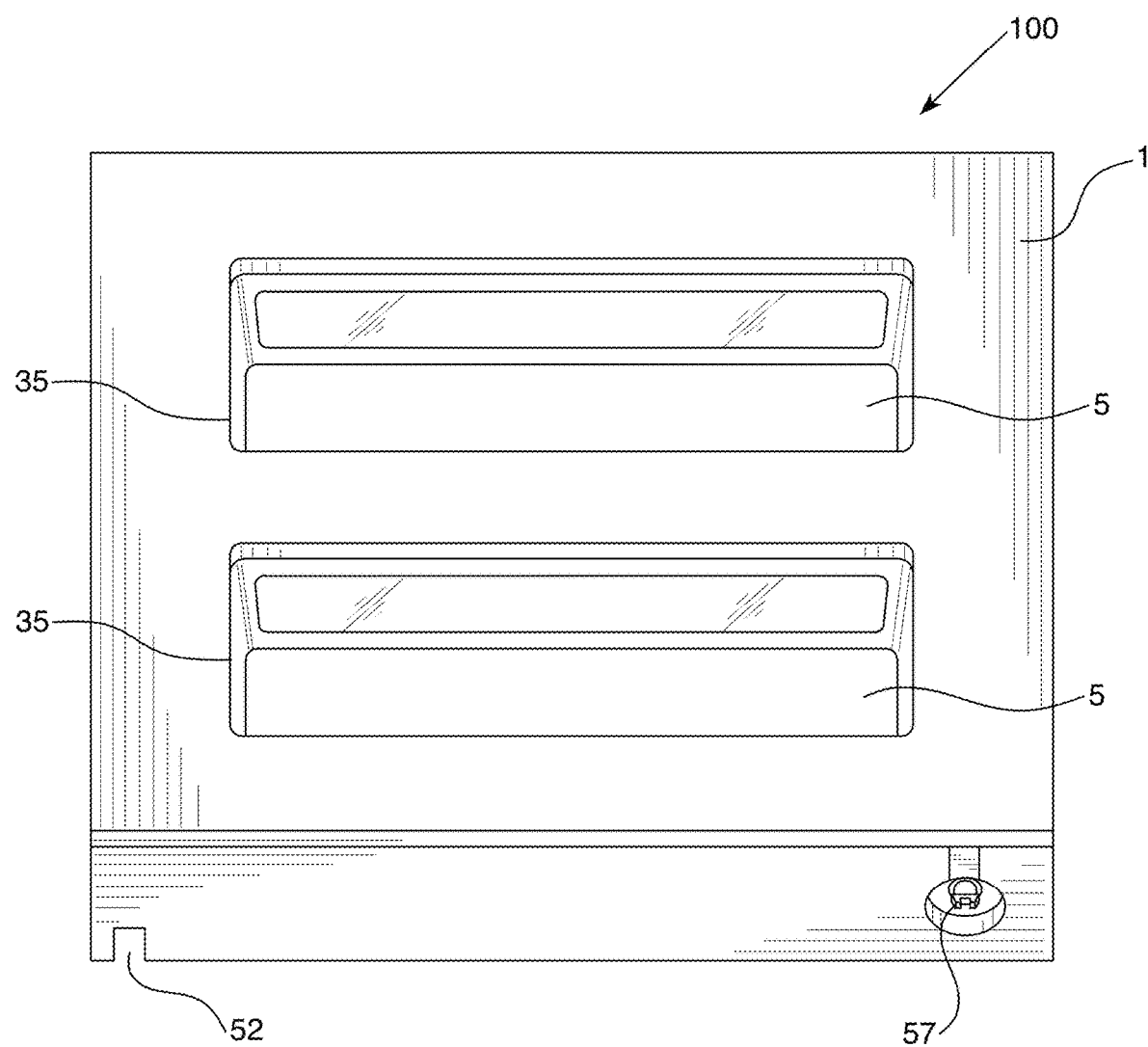
Figure 20A:
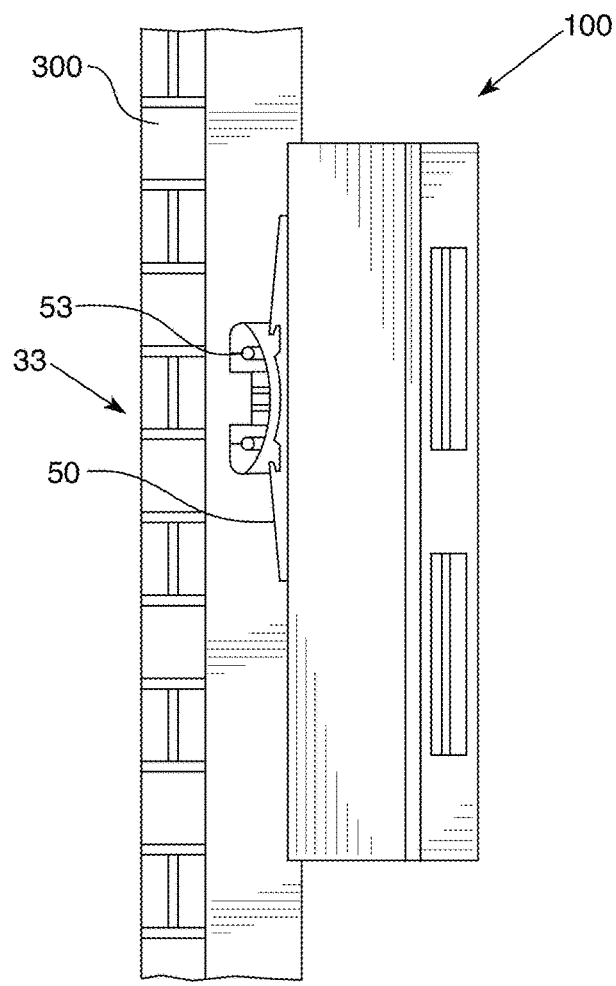
Figure 20B:
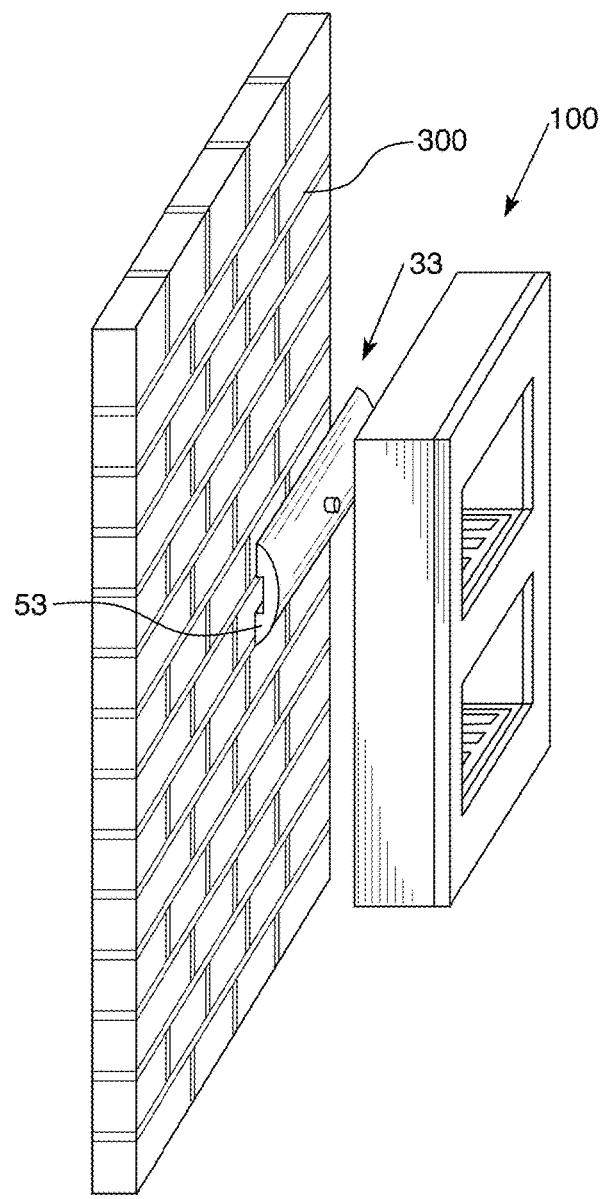
Figure 21A:
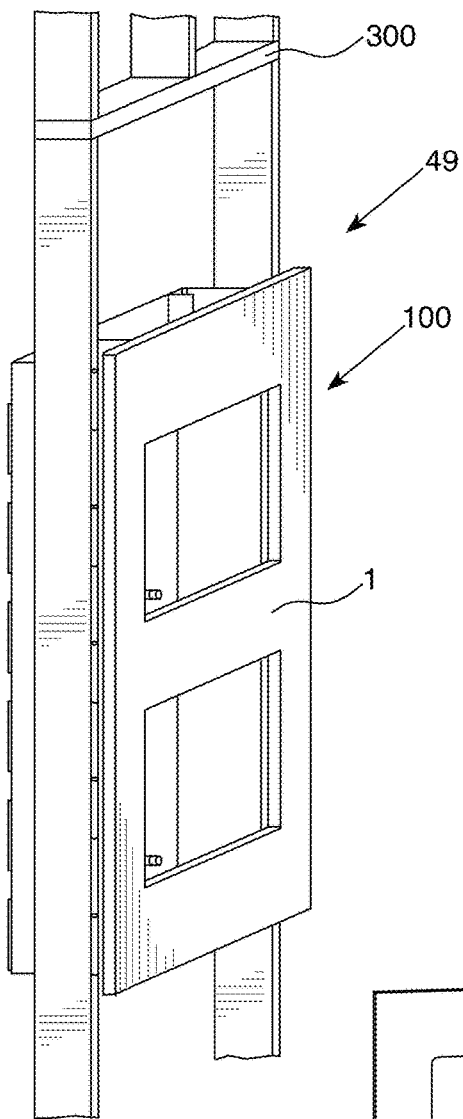
Figure 21B:
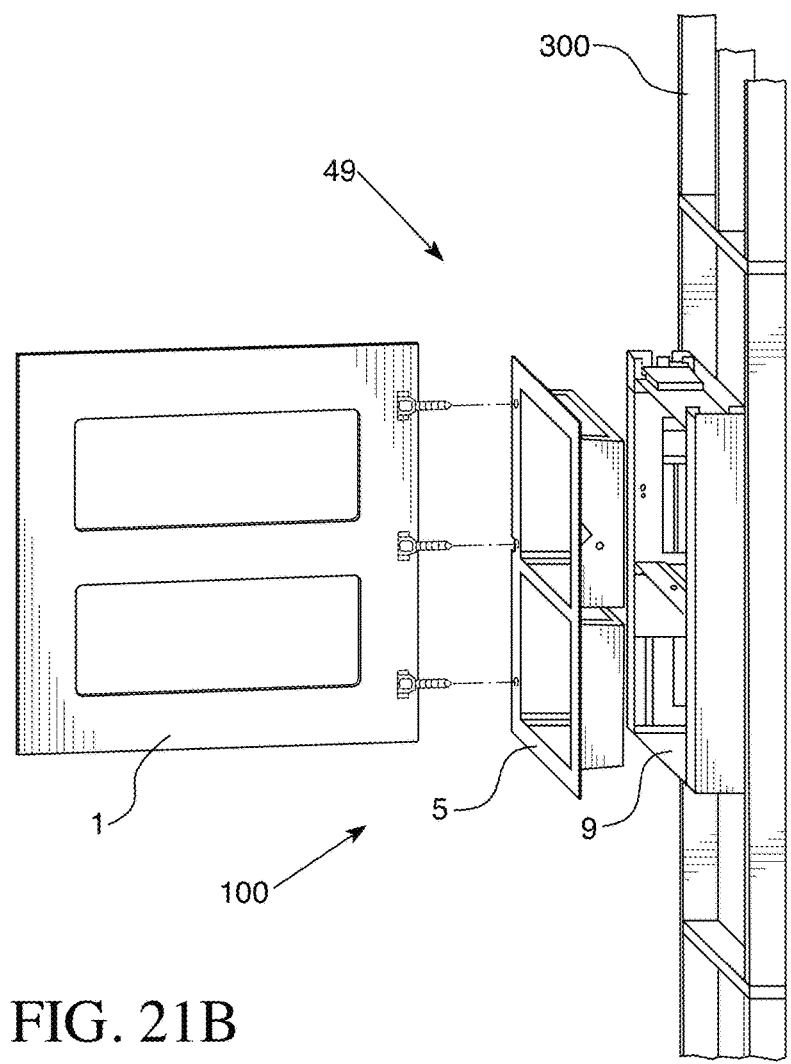
Figure 22A:
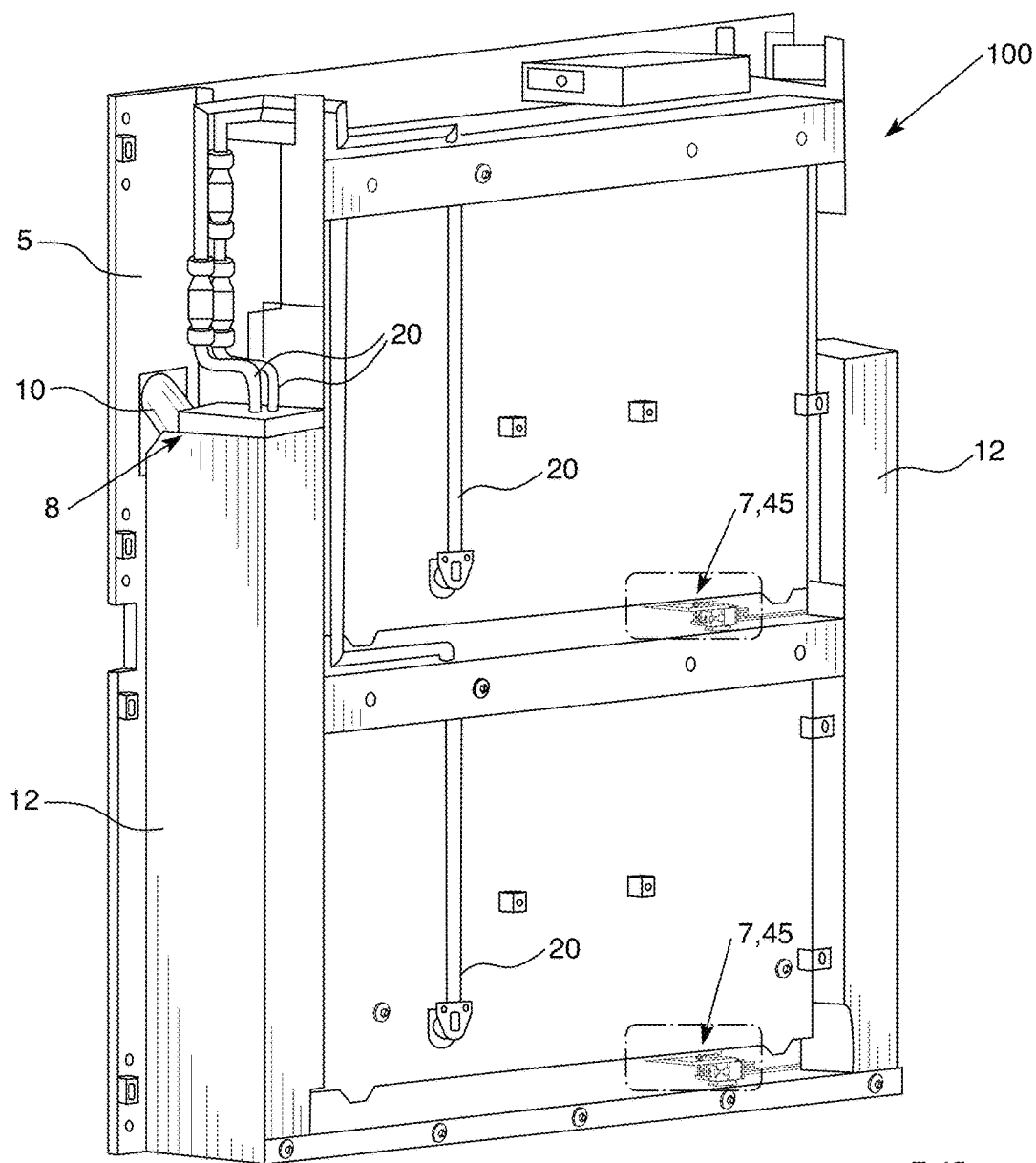
Figure 22B:
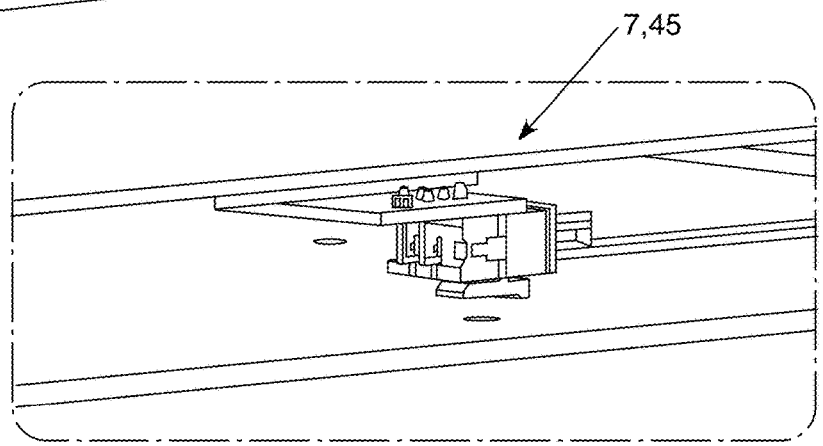
Figure 23:
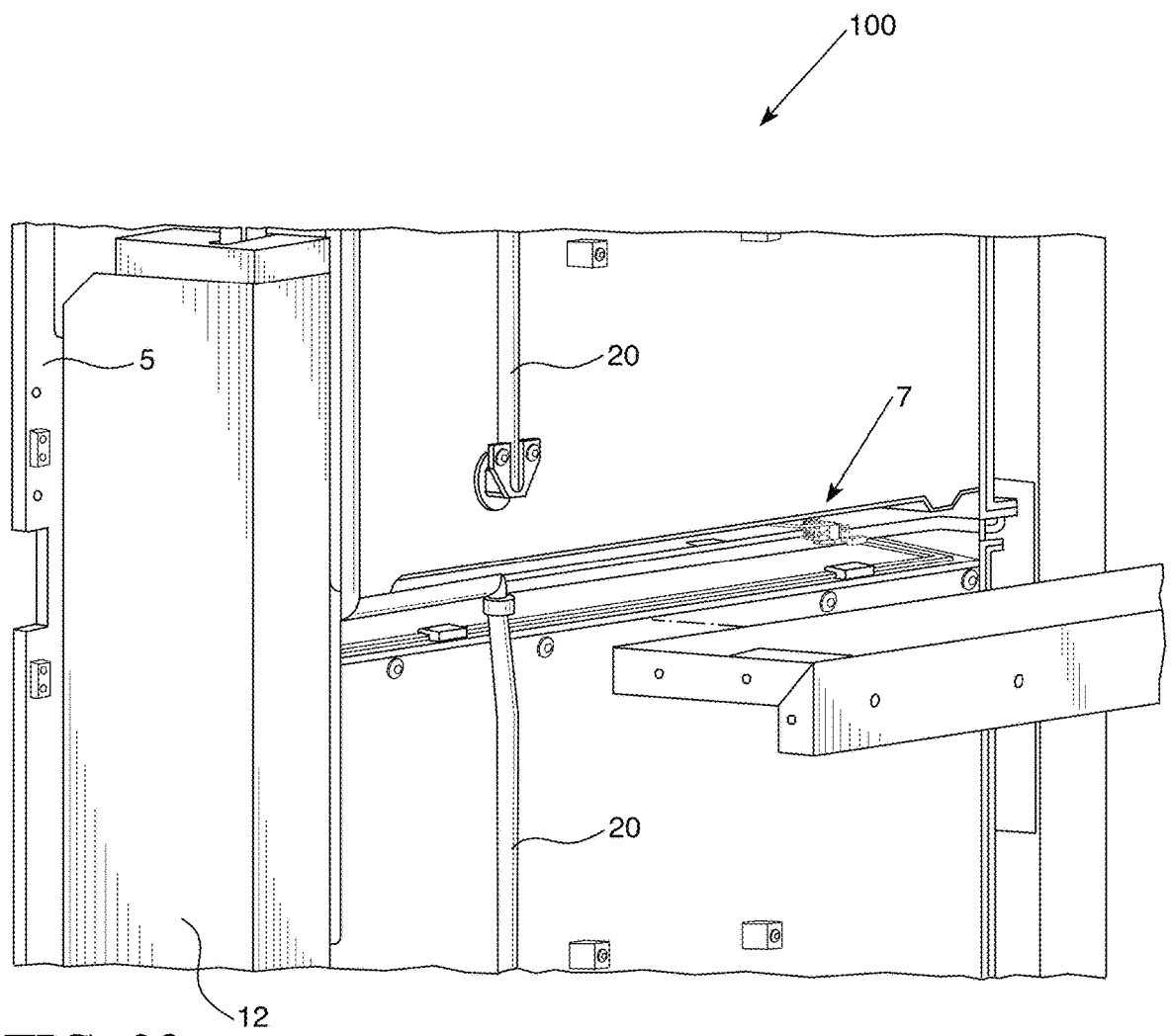
Figure 24:
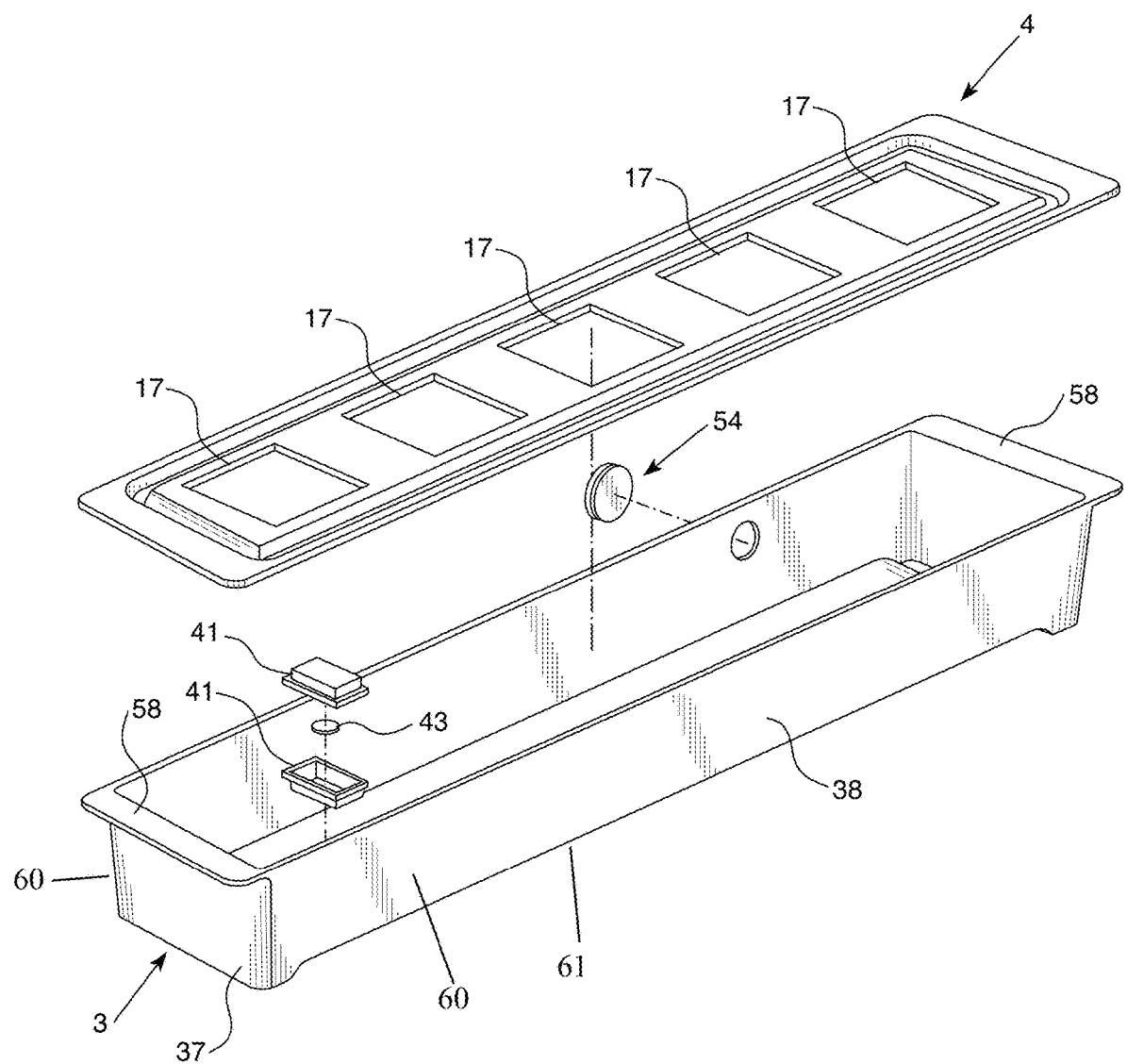
Figure 25:
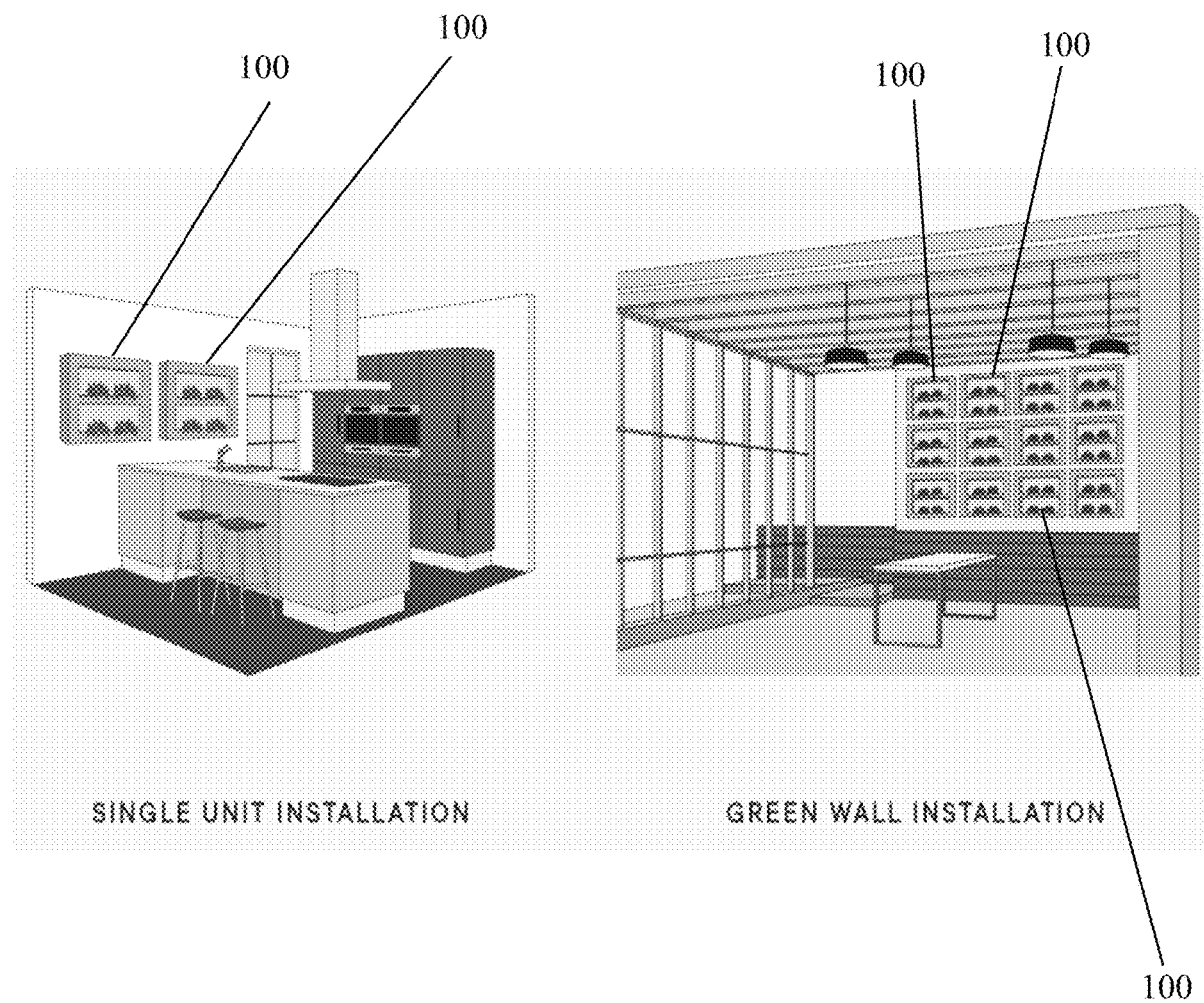

FIG. 18 details the structures and functions of one embodiment of a Hall Effect tray water level sensing system to determine tray water levels FIG. 19 shows an alternative embodiment of a wall garden system of the present invention in which the power cord housing and a drain port are visible;

FIGS. 20A and 20B illustrate a surface-mounted wall garden system and one embodiment of a wall mount and wall mount brackets;

FIGS. 21A and 21B illustrate a recessed installation of one embodiment of a wall garden system according to the present invention;

FIG. 22A illustrates the tubing of one embodiment of a water delivery system according to the present invention with a detail showing a Hall Effect water level sensor located under a tray and the front face insert and FIG. 22B shows one possible location for a Hall Effect sensor board;

FIG. 23 shows the grow lights from the back-side of one embodiment of a wall garden system according to the present invention;

FIG. 24 illustrates an alternative embodiment of a plant tray incorporating technology for Hall Effect tray water level sensing; and FIG. 25 illustrates two modular configurations having multiple wall garden systems installed on a wall to create a larger garden.

DETAILED DESCRIPTION OF THE INVENTION

The following describes example embodiments in which the present invention may be practiced. This invention, however, may be embodied in many different ways, and the descriptions provided herein should not be construed as limiting in any way. Among other things, the following invention may be embodied as methods, systems or devices.

The following detailed descriptions should not be taken in a limiting sense. The accompanying drawings are hereby incorporated by reference.

In this document, the terms "a" or "an" are used, as is common in patent documents, to include one or more than one. In this document, the term "or" is used to refer to a nonexclusive "or" such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

While the disclosure has been described in detail and with reference to specific embodiments thereof, it will be apparent to one skilled in the art that various changes and modifications can be made therein without departing from the spirit and scope of the embodiments. Thus, it is intended that the present disclosure covers the modifications and variations of this disclosure provided they come within the scope of the appended claims and their equivalents.

Wall Garden System 100. The present invention encompasses a wide variety of different embodiments of a wall garden system 100, its various novel parts and systems, methods of using a wall garden system 100, and the methods that make the elements or sub-systems of the wall garden system 100 function. One basic embodiment of a wall garden system 100 according to the present invention has at least the following elements (shown in FIGS. 1 through 3, 16 and 17): a front face insert 5, a structural frame 9, at least one shelf 36 connected to or incorporated into the front face insert 5, at least one plant tray 3, a tray water level sensor system 47, a water delivery system 8, a power input 15, and a microcontroller unit (collectively "MCU") 40. The preferred embodiments of both a method and system according the present invention wall garden system 100 are comprised of the following elements: a front exterior casing 1; an optional side exterior casing 2; a structural frame 9; a back 55; at least one shelf 36; at least one plant tray 3; an optional at least one plant tray lid 4; a front face insert 5; an optional user interface 6; an optional at least one grow light 16; a water delivery system 8 comprised of one or more water tanks 12, tubing 20, a pump 19, and a water system level sensor 21; a power input 15; a MCU 40; optional temperature and humidity sensor(s) 28; a low water indicator 29; optional wireless connectivity modules 30; an optional micro SD card reader 31; and an optional at least one camera 32. The various embodiments of a wall garden system 100 of the present invention can form various geometric shapes, and, as non-limiting examples, can be circular or oval in shape or have any number and combination of straight and/or curved sides to form any standard or irregular shape. A preferred embodiment of a wall garden system 100 of the present invention has least three sides; specifically, the front face insert 5 and the structural frame 9 each will have at least three sides. However, again, the various embodiments of wall garden systems 100 can have a wide variety of shapes including being circular, oval, triangular, rectangular, pentangular, hexangular, irregular, etc. The various wall garden systems 100 can have sides of equal lengths or varying lengths. Some wall garden systems 100 can have sides that are not straight, such as incorporating oval or curved sides. All such embodiments are included within the scope of this invention. Each of these elements are more fully described herein and shown in the accompanying figures. It will be obvious to one skilled in the art that not every embodiment of every wall garden system 100 of the present invention needs to have every element listed and there are numerous alternative technologies that can be substituted for some of these elements and serve the same purpose. All such variations are included within the scope of the invention.

The present invention is a novel wall garden system 100, in which plants are grown in a growth medium 23 or soil environment instead of a purely water-based, hydroponic environment (although aspects of this invention can be modified to include a purely hydroponic growth environment). One advantage of the present invention wall garden system 100 is its attractive, wall-mounted and/or wall-recessed design. Many existing gardens fall into one of the following categories, each of which has its own disadvantages. Many existing growing structures are table-top structures that require and take-up precious table, floor or shelf space. Alternatively, there are hydroponic growing devices and systems, which can be expensive and require a degree of expertise in the technology to use them. Many of the wall mounted gardens that exist are made of a soft material or netting that hangs from the wall and has pockets that are filled with soil and plants. These designs are unattractive, require constant maintenance, dirty, difficult to clean and maintain, and/or do not incorporate grow lights. The present invention is a novel wall garden system 100 that (i) incorporates a water delivery system 8, novel tray water level sensor systems 47, and optional grow lights 16 into it along with various other sensors; (ii) most embodiments use a non-hydroponic growing environment; and (iii) is aesthetically pleasing. FIG. 6A illustrates a fully or almost fully recessed installation of one embodiment of a wall garden system 100 of the present invention. FIG. 6B illustrates a partially recessed installation of one embodiment of a wall garden system 100 of the present invention. Finally, FIG. 6C illustrates a surface mounted installation of one embodiment of a wall garden system 100 of the present invention. FIGS. 21A and 21B illustrate an embodiment of a recessed (fully or partially) wall garden system 100 installed within a wall 300 and between the wall studs. The wide variety of wall-mounted or recessed configurations add to the present invention's novelty as it satisfies a growing market need for garden products that blend seamlessly with the surrounding environment and do not take up precious floor or tabletop space.

FIG. 6D illustrates one embodiment of a wall garden system 100 configured for surface mounting on a wall 300. The back 55 of a wall garden system 100 is shown n FIG. 6D having attached to it two wall mount brackets 50, which would attach either directly to a wall 300 or to a wall mount 53, which itself is attached to a wall 300. It will be understood by what is described herein that there are numerous ways to mount a wall garden system 100 to a wall 300. A surface wall mount mechanism 33 can be any of a variety of one-piece or multi-piece structures that would enable a wall garden system 100 of a certain size and weight to be attached securely to a wall 300. FIGS. 20A and 20B show an alternative surface wall mount mechanism 33, comprising a wall mount 53 attached to the wall 300 and a wall mount bracket(s) 50 attached to the back 55 of the wall garden system 100.

The installation of the wall garden system 100 depends upon many variables. The depth of the wall 300 and the material from which the wall 300 is constructed will determine how a wall garden system 100 is attached to or recessed into a particular wall 300. The size and weight of the wall garden system 100 also factor into the securing mechanism that is used. Additionally, the user's aesthetic preferences can dictate whether the wall garden system 100 is wall mounted or recessed (see FIGS. 6A through 6C).

Given the modularity of the wall garden system 100, multiple wall garden systems 100 can also be tiled together to create a green wall or food wall on the interior or exterior of a building. FIG. 25 illustrates the use of two wall garden systems 100 on the same wall. FIG. 25 also illustrates the use of twelve wall garden systems 100 mounted almost touching one another to create a wall for growing food.

Figure 1:
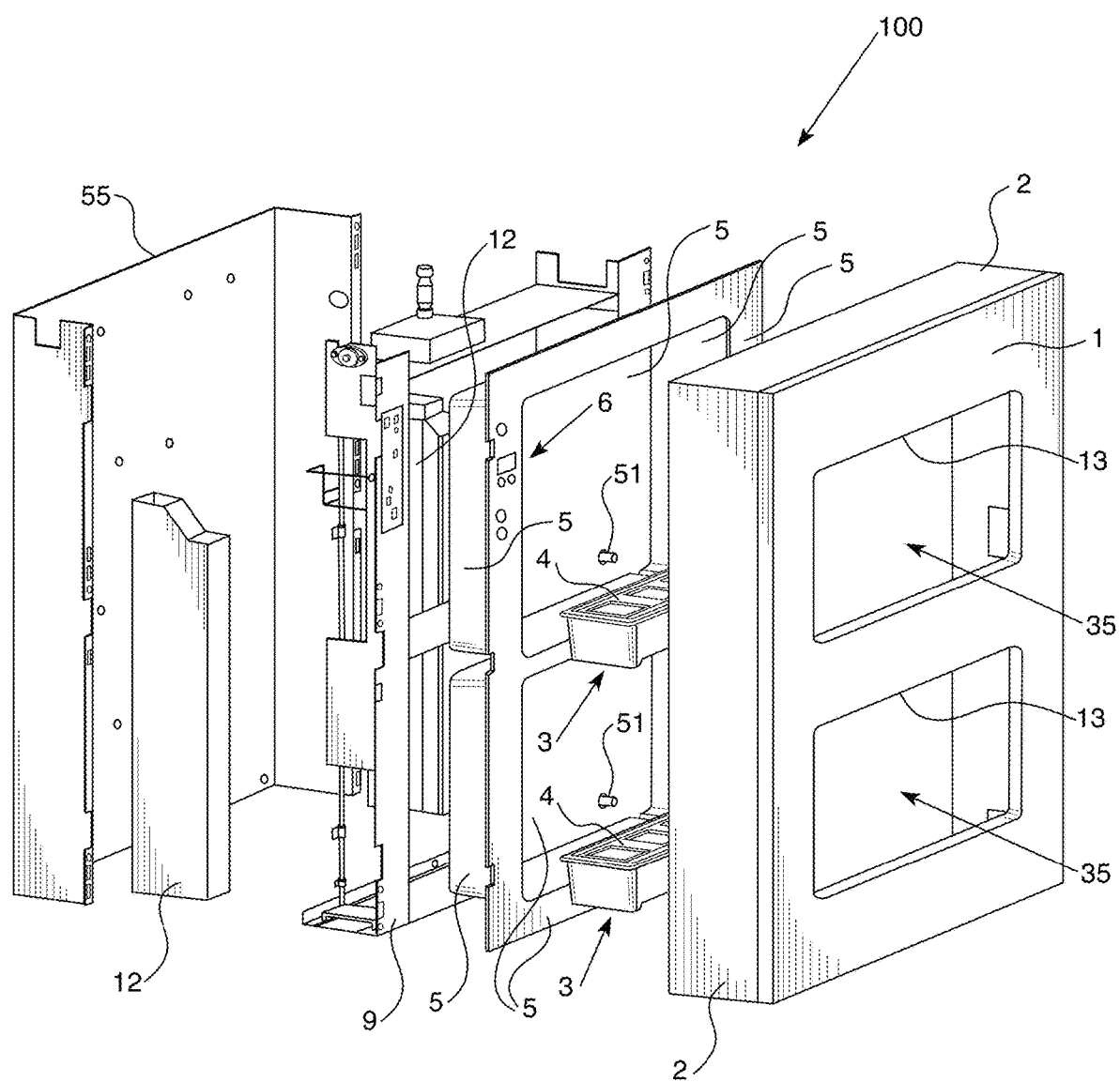
FIG. 1 is an exploded view of the various parts of one embodiment of a wall garden system according to the present invention.
Figure 2:
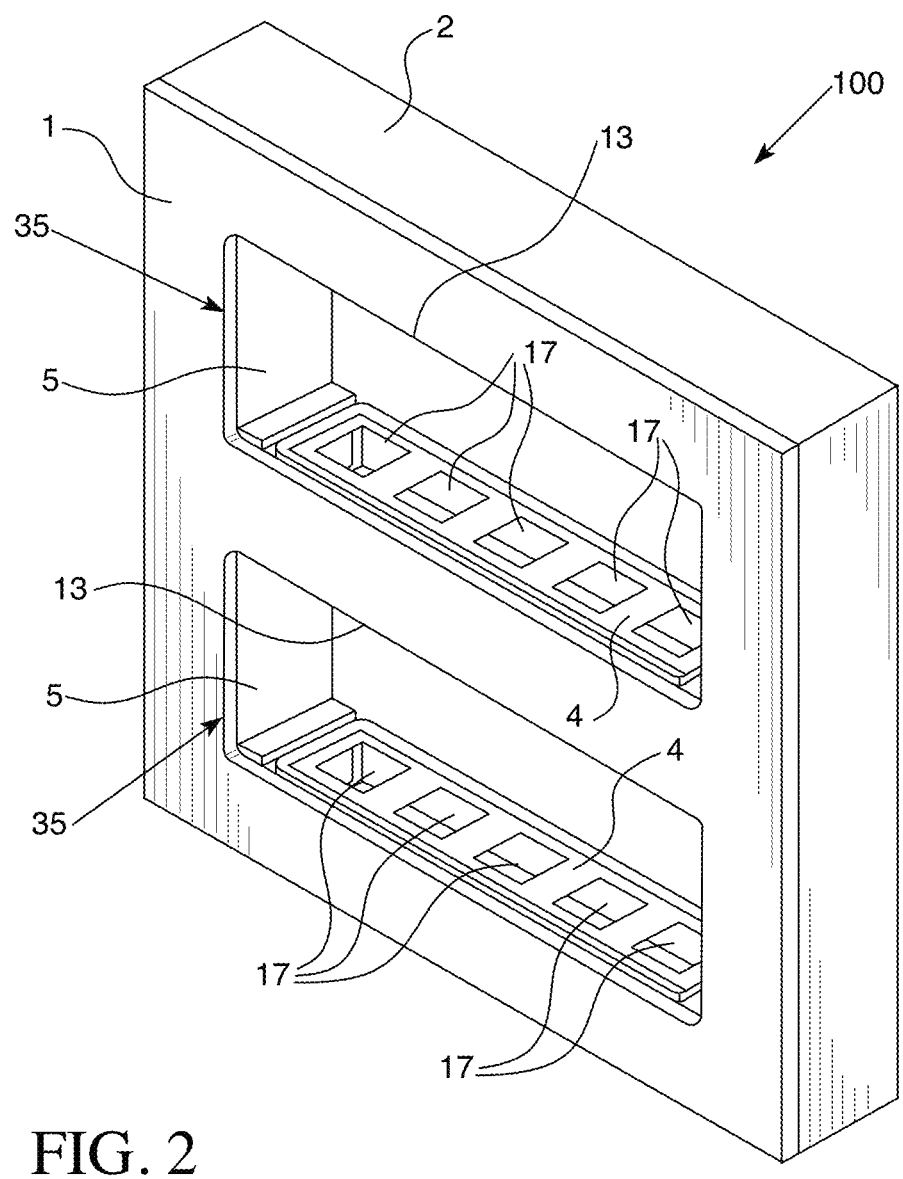
FIG. 2 shows one embodiment of a wall garden system according to the present invention with the front exterior casing closed.
Figure 3:
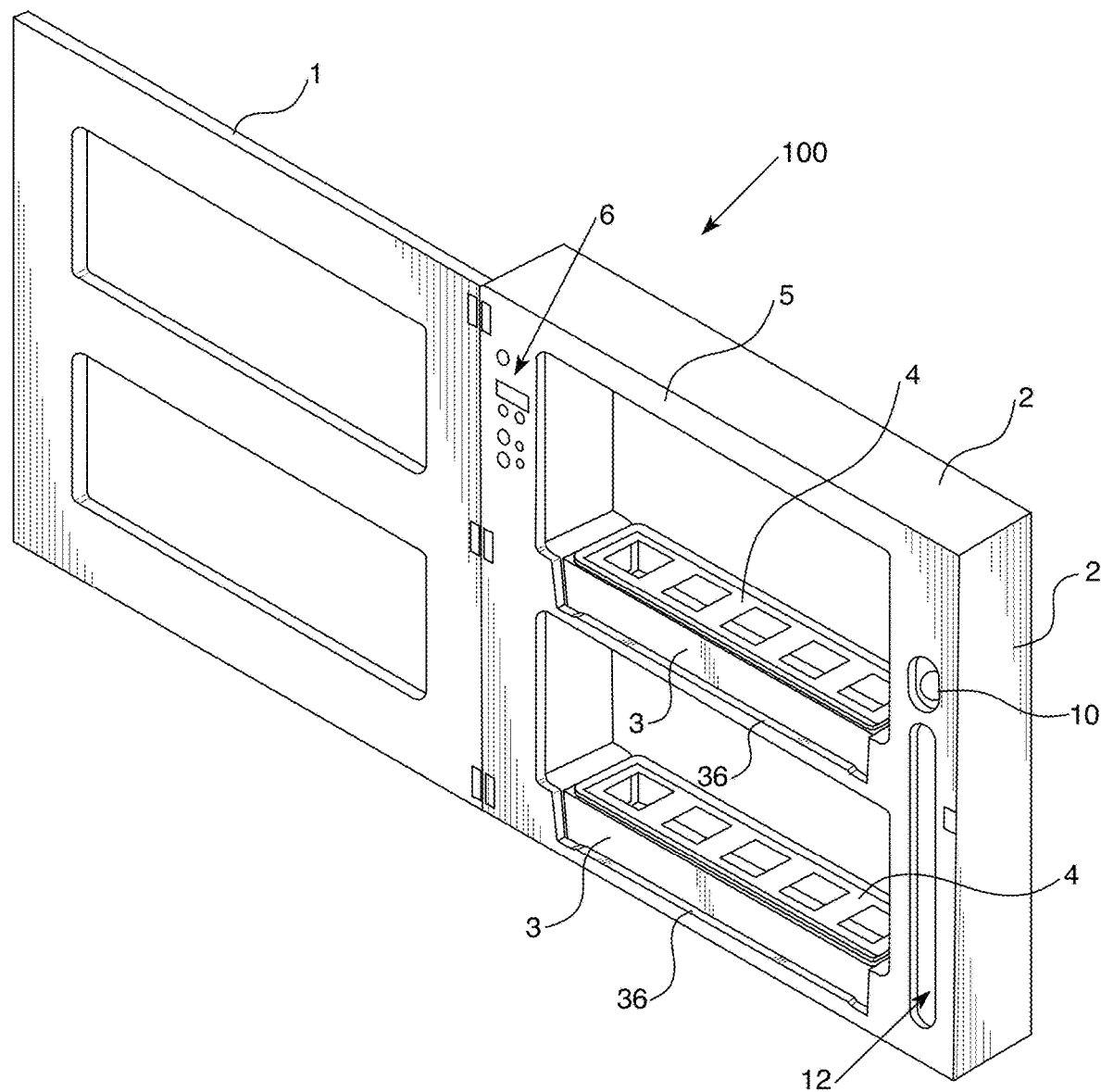
FIG. 3 shows the wall garden system of FIG. 2 with the front exterior casing open.
Figure 4A:
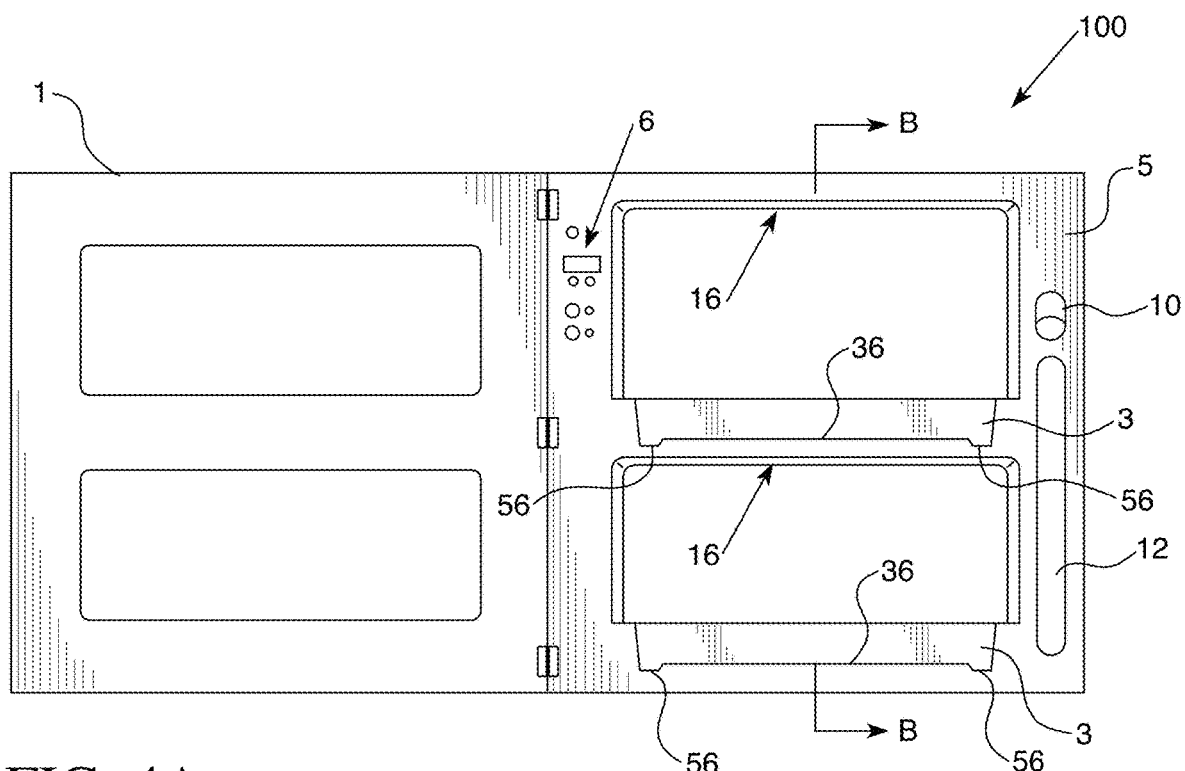
FIG. 4A is an alternative view of one embodiment of a wall garden system according to the present invention with the front exterior casing open, showing the interior system.

Casings 1,2. The present invention wall garden system's exterior casing 1 is the portion of the wall garden system 100 that is most visible to users after installation of the wall garden system 100. The exterior casing 1 acts as a door to cover the internal components of a wall garden system 100. Various embodiments of an exterior casing are shown in FIGS. 1, 3 and 4A (in which exterior casing 1 is open); FIGS. 2, 6A through 6C. 8A and 8B (in which exterior casing 2 is closed); and FIGS. 13A through 13C (in which exterior casing 1 has movable casing sections 34). The exterior casing 1 is both decorative and functional. The exterior casing 1 may be designed to be one piece (shown in FIGS. 1 through 8B). Alternatively, FIGS. 13A through 13C show three different exterior casings 1, each one designed to have a variety of movable casing sections 34. The exterior casings 1 of various embodiments of the present invention can be designed with any number of movable casing sections 34 to accommodate the design and functional aspects of each embodiment of a wall garden system 100. For one-piece or solid structure exterior casings 1, the exterior casing 1 may be hinged or movable at any one of the sides of a wall garden system 100. For exterior casings 1 that have a variety of movable casing sections 34 each section 34 may move or be hinged in a different direction and location depending upon the design aesthetic and function of the elements of the particular embodiment of a wall garden system 100. The exterior casing 1 can be connected using any of a variety of connection mechanisms including but not limited to hinges, magnets, hooks, clips, Velcro®, or other temporary or permanent mechanical attachment means. FIG. 3 illustrates a front exterior casing 1 hinged to the left side of the wall garden system 1 that swings open to allow access to the interior of the wall garden system 100.

For wall mounted embodiments of a wall garden system 100, a side exterior casing 2 can be used to provide an aesthetically pleasing cover to the sides of the wall garden system 100. The side exterior casing 2 of various embodiments of the present invention can be one-piece constructions, or they can be multiple, modular pieces that fit along the sides of a wall garden system 100. Examples of wall garden systems 100 with side exterior casings 2 are shown in FIGS. 1 through 3 and 13A through 13B. The dimensions of the side exterior casings 2 of the various embodiments of the present invention can vary depending upon how the size of the wall garden system 100 and how the wall garden system 100 is installed. A fully recessed installation would not need any exterior casings 2. A partially-recessed installation would have narrower casings than a surface wall-mounted installation.

As a decorative element, the front and side exterior casings 1, 2 can be made of any appropriate material or color to blend, complement, or contrast with the surrounding decor in the room in which the wall garden system 100 is mounted. Some non-limiting examples of materials that the exterior casings 1, 2 can be made of include wood, laminate, plastic, metal, or other decorative materials. The front and side exterior casings 1, 2 can be finished prior to purchase or they can be made of a material that can be painted or finished by the user after purchase.

As a functional element, and in various embodiments of the present invention, the front face insert 5 can act as the exterior of the wall garden system 100 and facilitates core system functionality relating to the electrical, sensor, lighting, watering, and air circulation systems (described more fully herein). The front exterior casing 1, when included in a wall garden system 100, covers portions of the front face insert 5. As shown in FIG. 3, by designing a front exterior casing 1 that moves, in whole or in part, the user can easily access the internal components of the wall garden system 100 such as the plant trays 3, the water tank inlet(s) 10, and the user interface 6.

For the various embodiments of the present invention, the front exterior casing 1 will have at least one plant window 35 (shown in FIGS. 1 through 3), which are open sections through which the plant(s) 200 grows (see FIGS. 8A and 8B) and air circulates. Some embodiments of the exterior casing 1 may have a lip 13 at the top of the plant window 35. This optional lip 13 is an extension of or an attachment to the front casing 1, which extends down beyond the grow light(s) 16. This optional lip 13 is part of the preferred embodiment because it prevents the grow lights 16 from emitting light straight out from the wall garden system 100 and the lip 13 reflects the light back toward the plant(s) (see FIG. 1 and FIG. 2.)

Some embodiments of the present invention wall garden system 100 may not require an exterior casing 1 and/or side casings 2. For example, if the wall garden system 100 is to be recessed into a wall 300 or recessed and hidden into cabinetry then the sides of the wall garden system 100 will be hidden and will not require side exterior casings 2 (see FIGS. 6A and 6B) or a front exterior casing 1 if it is installed withing existing cabinetry or furniture. Finally, the front face insert 5 can be the exterior or user-facing surface of a wall garden system 100 of one embodiment of the present invention.

Similar to the front exterior casing 1, the side exterior casing 2 can be configured with any number of openings, holes, and/or access points for functional elements of the different embodiments of the present invention. FIG. 19 illustrates one embodiment of a wall garden system 100 in which the side exterior casing 2 is configured to incorporate a power cord housing 52 and a drain port 57 for draining the water tank(s) 12 without removing them from the wall garden system 100.

Structural Frame 9. Many of the components of the various embodiments of a wall garden system 100 are contained within a structural frame 9 that acts as the main mounting point for the exterior casing 1, the front face insert 5, the water delivery system 8, and various electrical components including the MCU 40 and the grow lights 16. The structural frame 9 is shown in context in FIGS. 1 and 3. The structural frame 9 is at least three-sided with a back 55 and can be made of one piece of material or multiple connected pieces and acts as the main structural support and skeleton of the wall garden system 100. As shown in FIGS. 6C and 6D, the back 55 of the structural frame 9 connects directly to the wall 300 via a wall mount mechanism 33. The structural frame 9 can be made out of any structurally sound material including metal (such as steel or aluminum), metallic materials, polymer materials, composite materials, natural woods, synthetic woods, or a rigid plastic. It also has the capability to be built directly into a wall 300 of a building or cabinetry (FIG. 6), eliminating the need for the wall mounting mechanism 33 and, depending upon the installation, eliminating other components such as the side exterior casing 2 and water tanks 12.

Plant Trays 3. The various embodiments of the present invention incorporate novel plant trays 3 that facilitate plant growth, easy insertion and removal of the plant tray 3 into the wall garden system 100, and easy insertion and removal of growth media 23 from the plant tray 3. One of the main challenges of growing food, especially indoors in a wall mounted application, is harvesting. It can be very messy to harvest plants directly from a wall-mounted structure, and then having to carry the plants to the cooking area. Even harder, is replacing the growth media 23 from these plants with another media 23 containing new seeds. This old media 26 has to be thrown in the compost or the trash; contains entangled roots; is dirty; and is usually dripping with water. Yet, this is the status quo in the industry today. The plant trays 3 of the present invention simplify this process by containing at least one and preferably more than one plant 200 and easily slide out of the wall garden system 100 during harvest. The user can bring the entire tray 3 over to the cooking area, harvest their plants 200, place in new growth media 23 or a new plant growing system 26, and replace the tray 3 back in the system 100, which is a much easier process than harvesting and replanting each plant 200 individually off the wall 300 as with traditional structures. The removability of the trays 3 with their self-contained plant growing systems 26 is shown in FIGS. 1 through 5D and 24.

Additionally, for each specific embodiment of a wall garden system 100, every corresponding plant tray 3 is designed to be the same and interchangeable. In embodiments with a high volume of plants 200 being grown, trays 3 containing new growth media 23 can be waiting and plugged directly into the wall garden system 100 when the old tray 3 with mature plants 200 is removed. This gives additional time for harvesting and cleaning, while new plants 200 immediately start to grow. This modularity also enables various other uses for the trays 3 such as putting them out into sunlight, or into another type of food growing appliance, where they can stay, or ultimately be placed back into the wall garden system 100. The tray 3 removal and insertion process is simple for a person to do, thanks to the handles on the tray, and the tray's 3 ability to slide out seamlessly, enabled by the contactless tray water level sensors 7 and grooves 56 in the front face insert 5 (see FIG. 17) that help the tray 3 mate directly with the water inlet nozzle. The tray handles 58 can have any design that fits within a particular embodiment of a wall garden system 100 and eases movement of the tray 3. One example of a tray 3 with handles 58 is shown in FIG. 24. One embodiment of the trays 3 of the present invention also incorporate a tray fill nozzle 51 (shown in FIG. 17), which connects to the tubing 20 of the water delivery system 8 so enable the water delivery system 8 to fill the tray 3. This process and the reinsertion of a new tray 3 can also be automated for use with a drone or another form of robotics.

In traditional garden systems, aside from the user experience of harvesting, cleaning food growing devices also is a major challenge, significantly affecting the performance and lifetime of many products. Plant roots, residue from the growth media, and buildup of inorganic salts from plant nutrients, as well as other living organisms such as fungi and algae, all collect wherever the plants are growing. Over time, these things degrade the trays and systems, which then need to be cleaned to avoid device failure. Oftentimes, this cleaning process is very difficult and has to be done on large parts that require deconstruction of the system, sometimes including electronics. Due to the size of the parts and intricacies in their design, there is no choice but to wash them by hand.

In the various embodiments of the present invention, the plant trays 3 in the wall garden system 100 are the only place where plants 200 are located, so the rest of the system and device is kept clean. Thus, the only cleaning needed is for the plant trays 3 themselves after harvesting. The plant trays 3 do not incorporate any complex features beyond components of the tray water level sensor system 47, so the trays 3 simply can be rinsed in a sink, scrubbed by hand, or even placed in a dishwasher, depending upon the size of the trays 3 and assuming that the embodiment is made from dishwasher safe materials. This isolation of the plants 200 in the trays 3, and related ease of cleaning, ensures that the trays 3 and the wall garden system 100 functions optimally and are not deteriorating, maximizing the wall garden system's performance and lifetime (see FIGS. 1 through 5D and 24).

Figure 4B:
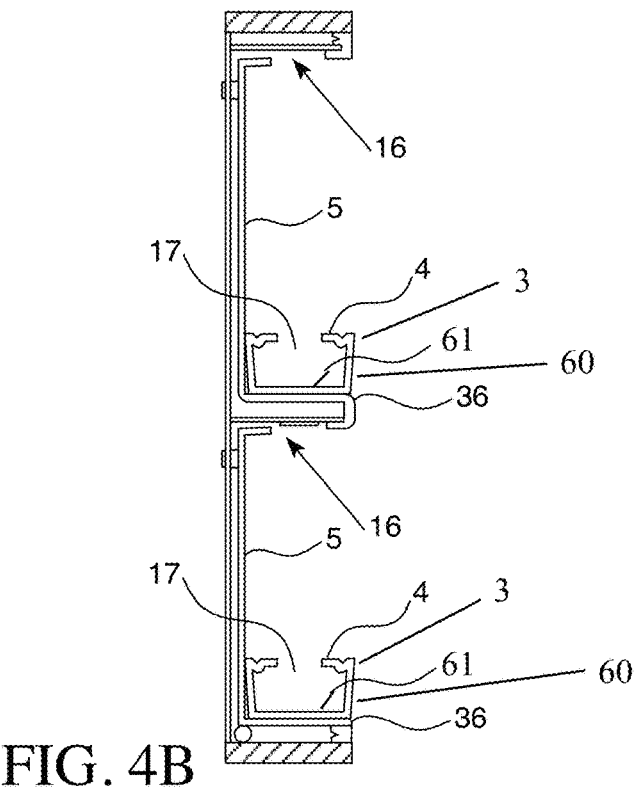
FIG. 4B is a cross-sectional view of the wall garden system shown in FIG. 4A.

The various embodiments of plant trays 3 are configured to be easily removed from a wall garden system 100 system for maintenance and cleaning. FIG. 4A illustrates one embodiment of two plant trays 3 inserted into a wall garden system 100 of the present invention. The plant trays 3 slide into and fit within the front face insert 5. FIG. 4B is a cross-section of the wall garden system 100 of FIG. 4A, showing the trays 3 sitting on shelves 36 within the front face insert 5.

Figure 5A:
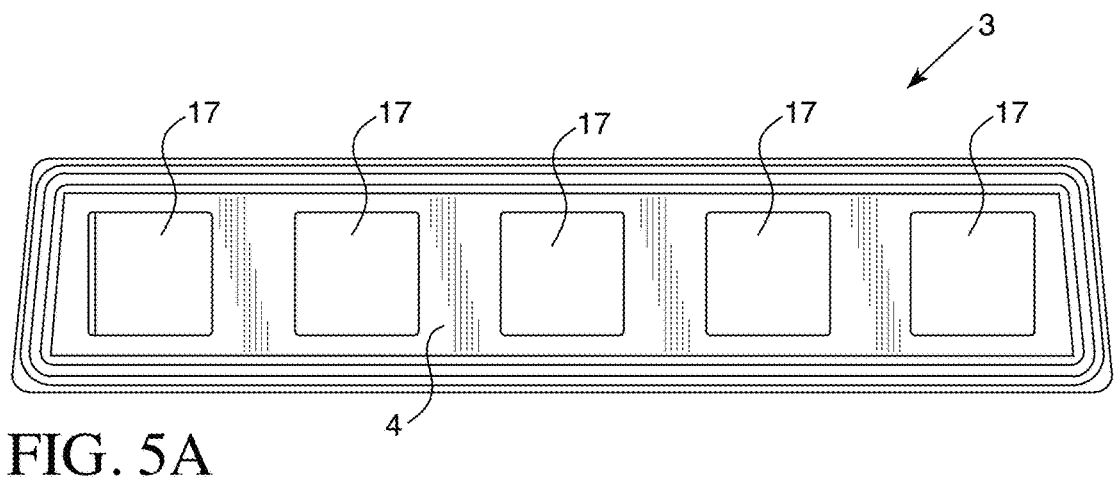
FIGS. 5A through 5D depict various views and components of one embodiment of a plant tray according to the present invention.

The various embodiments of a plant tray 3 of the present invention can have a bottom 61 of any shape with whatever number of sides 60 is necessary to surround the bottom 61 shape to make a container that holds water. Plant trays 3 of the present invention can be circular or oval in shape (when viewed from the top-down) or have any number of sides 60 that are any combination of straight and curved sides 60 to form any standard or irregular shape. A preferred embodiment of a plant tray 3 of the present invention has least three sides 60 connected to a bottom 61 to form a container that can hold water and at least one plant growing system 26. Four different views of one embodiment of a rectangular plant tray 3 are shown in FIGS. 5A through 5D. FIG. 5A shows a top down view of a plant tray 3 with a plant tray lid 4 on the plant tray 3. The plant tray lid 4 has at least one (and, in FIG. 5A, five) plant tray openings 17. Each plant tray opening 17 provides a space through which a plant 200 can grow. A plant growing system 26 can be situated within or beneath each plant tray opening 17. The plant tray lid 4 is optional. In some embodiments, the plant tray 3 can be configured to hold the plant growing system 26 without the need for a lid 4. However, the preferred embodiment of the present invention utilizes a plant tray lid 4, which helps to reduce evaporation, contamination and light exposure to the water and roots.

Figure 5B:
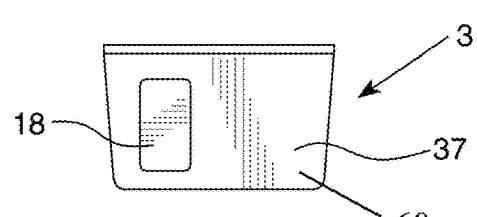
Figure 5C:
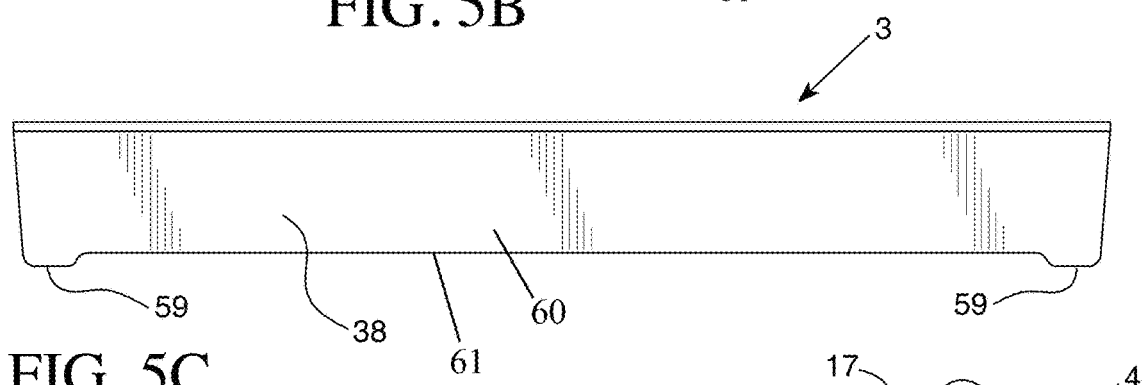
Figure 5D:
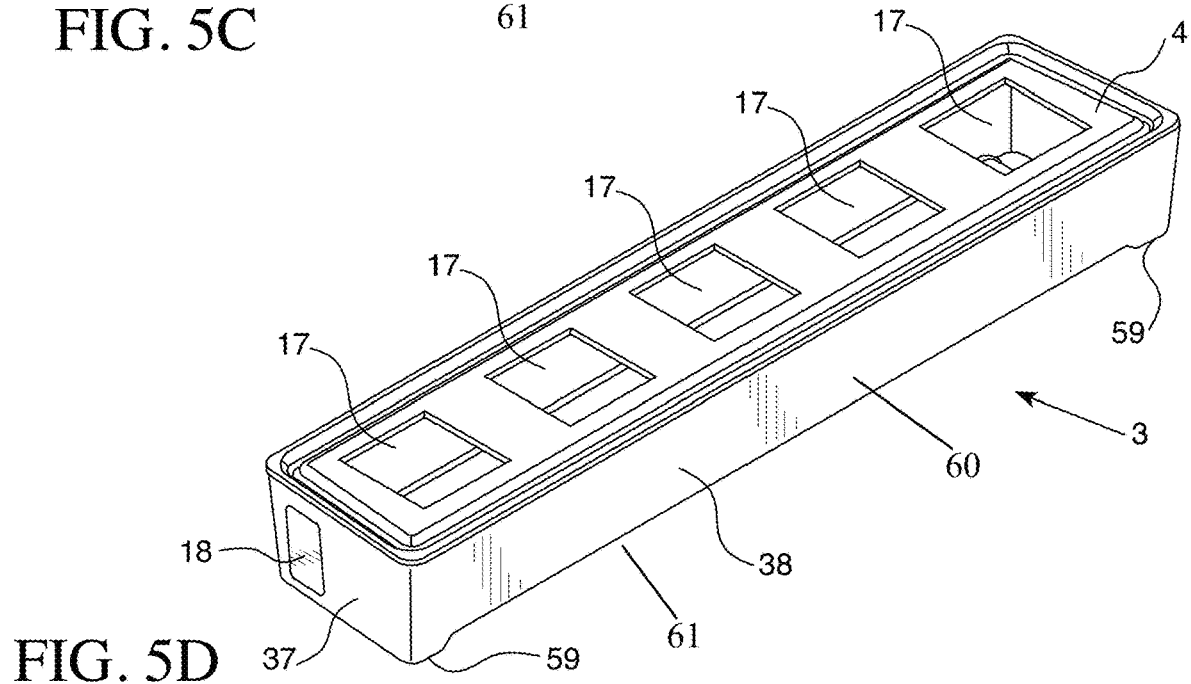

FIG. 5B shows a short side 37 of one embodiment of a plant tray 3 having a transparent window 18. FIG. 5C shows a long side 38 of a plant tray 3. FIG. 5D is a perspective view of the plant tray 3 shown in FIGS. 5A through 5C having four sides 60, a bottom 61 and a lid 4. The plant trays 3 can be made from plastic or composite material that will not degrade under prolonged water, plant nutrient 24, and dish soap exposure. While the embodiments shown herein have the transparent window 18 on a short side 37 of a tray 3, it will be understood by one skilled in the art that the transparent window 18 can be on any side 60 of the tray 3 that is adjacent to the tray water level sensor 7 location incorporated into the front face insert 5.

Figure 15A:
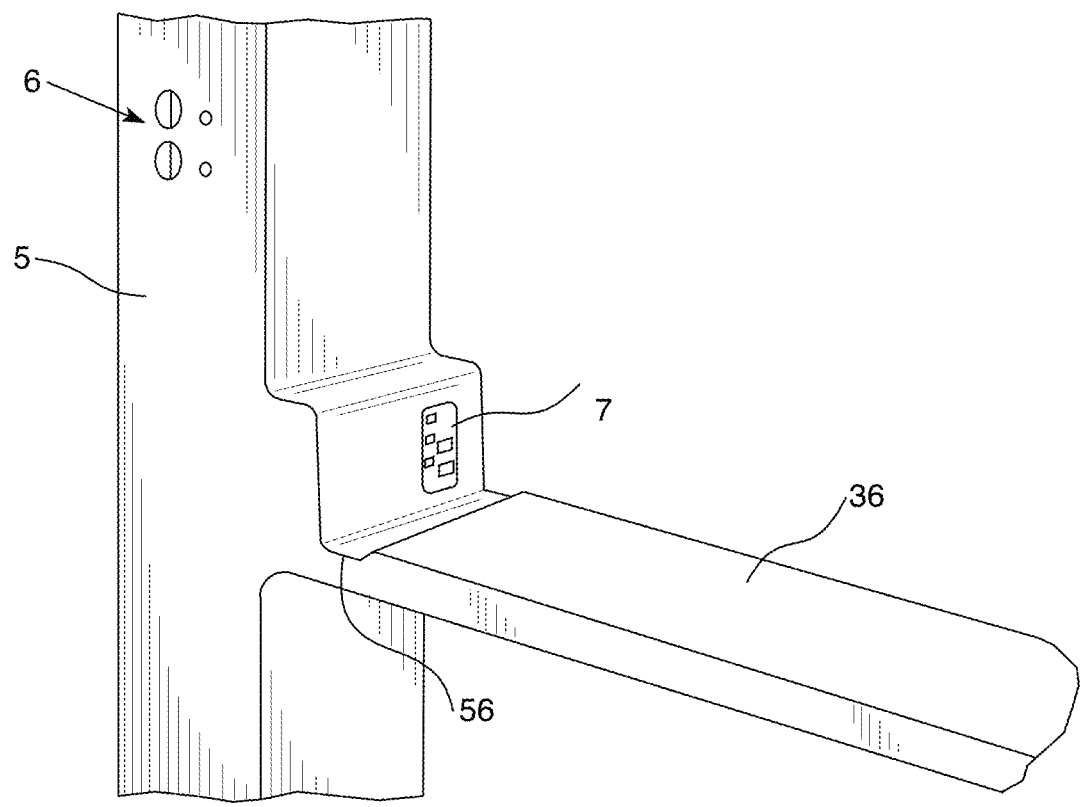
FIGS. 15A and 15B depict one embodiment of a tray water level sensor that detects the amount of water in a plant tray.
Figure 15B:
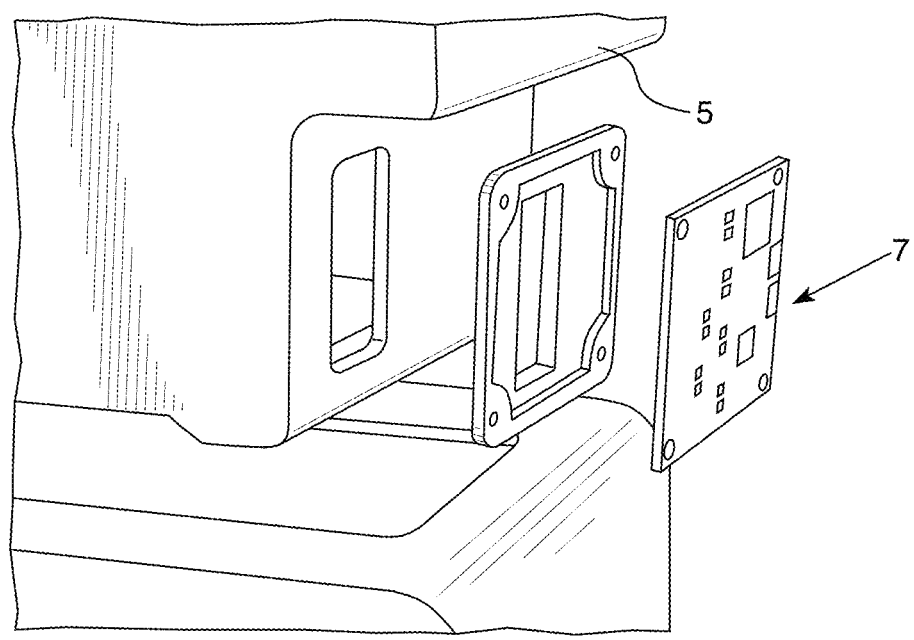

The at least one plant tray 3 fits into the front face insert 5 and allows for reading the water level via tray water level sensors 7, which are the components of the water level sensor system 47. In one embodiment of the present invention, sensing the water level in a plant tray 3 is accomplished by an array of infrared ("IR") or other tray water level sensors 7 that "look" through the window 18 of a plant tray 3 to measure the water level in the tray 3 (see FIGS. 3, 5B, 5D, 15, 16 and 17). Various embodiments of this invention include sensors 7 that can detect the presence of plant tray 3 inserted into the system 100 as well as to determine the water level in the tray 3. These sensors 7 enable the wall garden system MCU 40 to determine the watering timing and schedule for the plants 200. This sensing may be performed by IR sensors 7 that can detect the presence of an inserted plant tray 3 and, if pointed through IR transparent windows 18 in the plant trays 3, can also detect the presence of water in the plant tray 3. In one embodiment of the present invention, a linear array of sensors 7 is vertically oriented pointing through this window 18. Using this configuration, the water fill level in the plant tray 3 may be determined (see FIGS. 5 and 15). Alternatively, IR sensors 7 may be replaced with alternative tray water level sensors 7 utilizing a linear array of water sensing capacitive sensors, a linear array of Hall Effect sensors with a floating body 41 containing a magnet 43 (collectively referred to as a float 41 or magnetic float 41) inside the plant tray 3, or other types of tray water level sensor systems 47. FIGS. 15A and 15B depict one embodiment of an IR-based tray water level sensor 7 that detects the amount of water in the plant tray 3.

As shown in FIGS. 5B and 5D, one embodiment of a plant tray 3 according to the present invention is configured to have an IR transparent window 18, which allows for reading the water level in the tray 3 via IR tray water level sensors 7 (also shown in FIG. 13C). Alternative embodiments of plant trays 3 for use with IR sensors can be designed without an IR transparent window 18 if the plant tray 3 itself is made of IR transparent material for water level sensing or the wall garden system 100 incorporates another type of water level sensing mechanisms, such as ultrasonic water level sensing, electro-mechanical or magnetic float switch, or conductive water level sensor technology.

Figure 16:
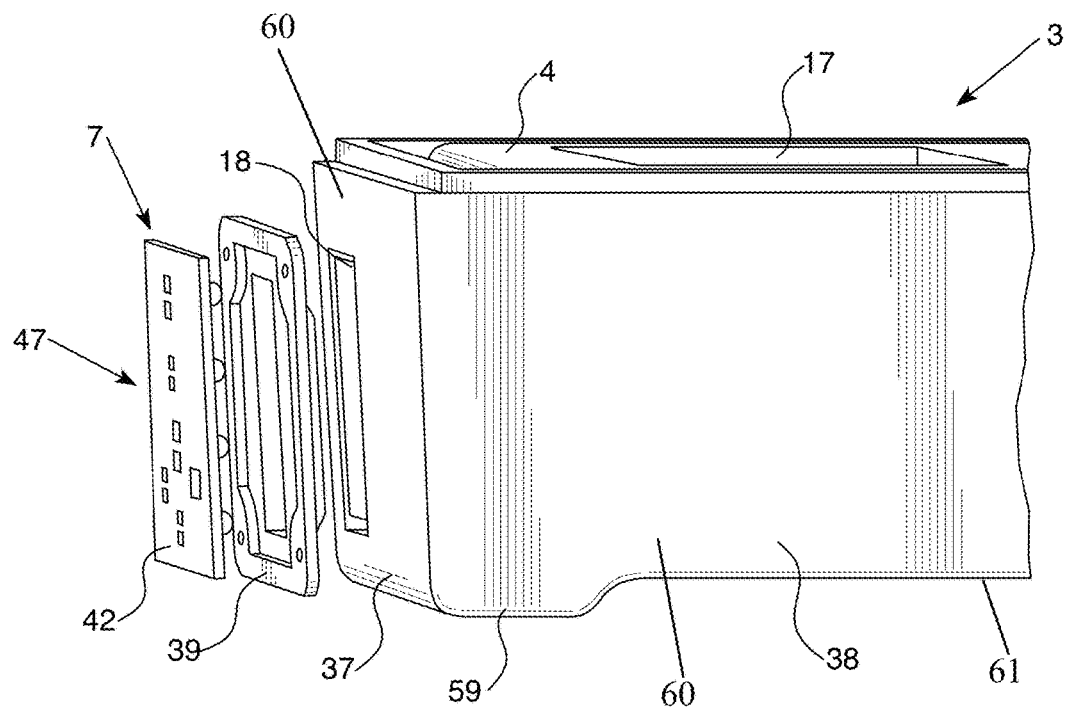
FIG. 16 illustrates one embodiment of an IR tray water level sensing system to determine water level in a tray.

FIG. 16 is a detailed illustration of one embodiment of an IR water level sensing system 47. This embodiment has a transparent window 18 on the short side 37 of a plant tray 3. An IR sensor board 42 (one type of tray water level sensor 7) is attached to the front face insert 5 adjacent to the short side 37 of the tray 7. If needed a protective lens 39 covers the IR sensor board 42. This water level sensing system 47 is one mechanism for sensing the water level in a plant tray 3.

Figure 17:
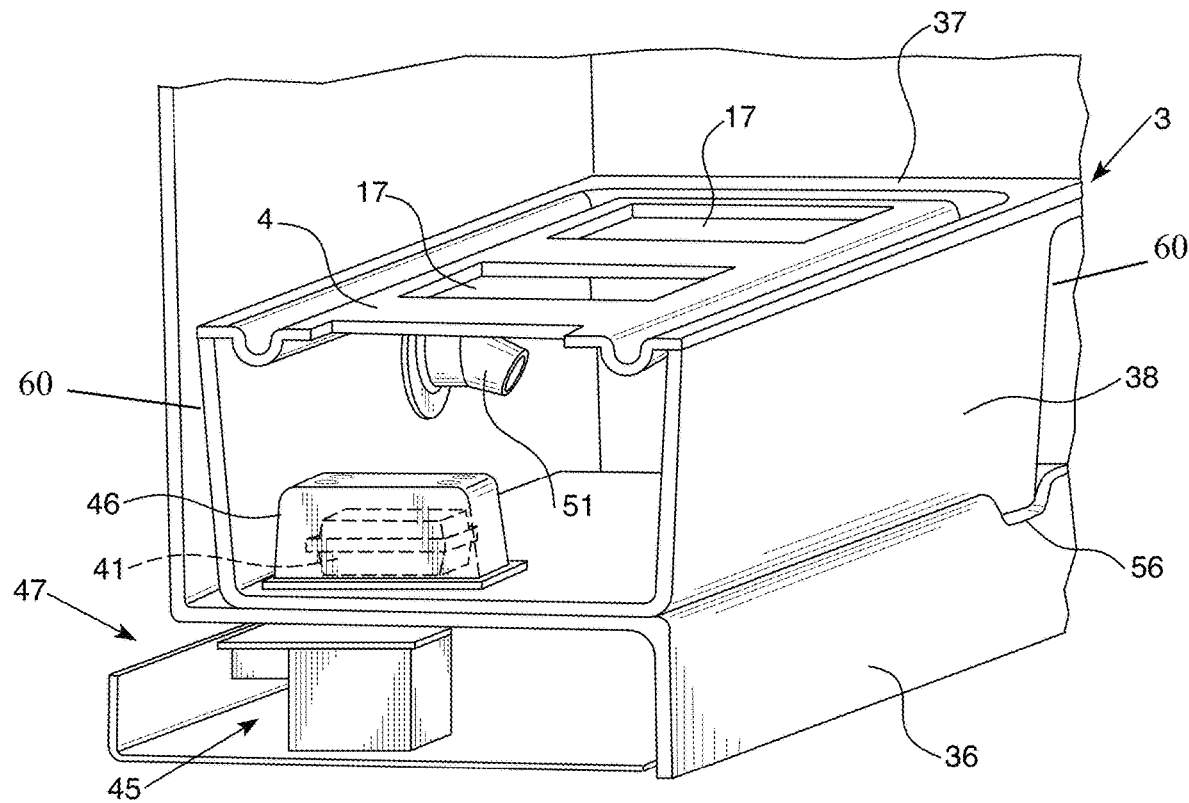
FIG. 17 illustrates one embodiment of a Hall Effect tray water level sensing system to determine water level in a tray.

In an alternative embodiment as shown in FIG. 5A through 5D, 15A through 17, and 24, the advantages of the removable trays 3 are enabled further by a contactless water level sensor technology which leverages Hall Effect sensors and magnetic floats 41 as the tray water level sensor 7. In one embodiment, the Hall Effect sensors 7 are laid out in an array on a printed control board 45 and are positioned a predetermined distance under the trays 3 on or incorporated into the shelves 36. The trays 3 contain a floating hollow body 41, which encloses a magnet 43 and is located above the Hall Effect sensor board 45. Whenever the float 41 is at the bottom 61 of the tray 3, the Hall Effect sensor 7 signals a low water level to the control board or MCU 40 which activates the pump 19 that dispenses water into the tray 3 until water reaches a predetermined height (in the preferred embodiment, 1.2 cm in height, which is the ideal water height for plants to grow in the wall garden system 100). However, this predetermined height may vary depending upon the structure and design of the wall garden system 100, the structure and design of the tray(s) 3, and the type of plant 200 being grown. The float 41 geometry and material and the magnet 43 diameter and thickness are determined based on the required buoyancy, which in turn is determined by the Hall Effect sensors' threshold proximity activation. The movement of the float 41 is restricted on the same Z-axis by a float channel 46. The interdependence of these parameters are illustrated in FIG. 18 and one embodiment of the mechanical design is shown in FIG. 17.

FIG. 24 illustrates an alternative embodiment of a tray 3 of the present invention that utilizes a Hall Effect tray water level sensor system 47. As shown in FIG. 24, a magnet 43 is enclosed within a float 41 inside the tray 3. The tray 3 also incorporates a seal 54 that interfaces with the tray fill nozzle 51 to enable the water delivery system 8 to dispense water directly into the tray 3 (shown in FIGS. 17 and 24).

Figure 8A:
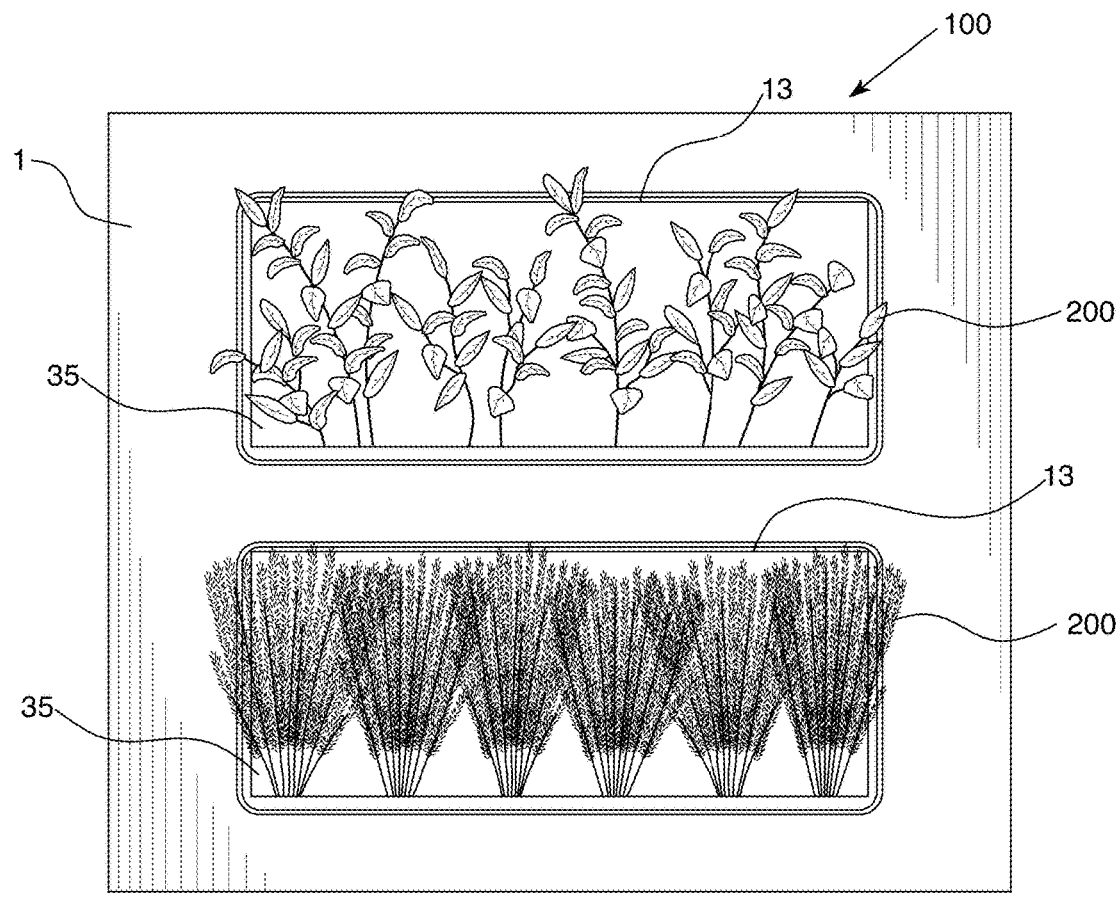
FIGS. 8A through 8C illustrate three embodiments of a wall garden system, each embodiment having one or two rows of plants.
Figure 8B:
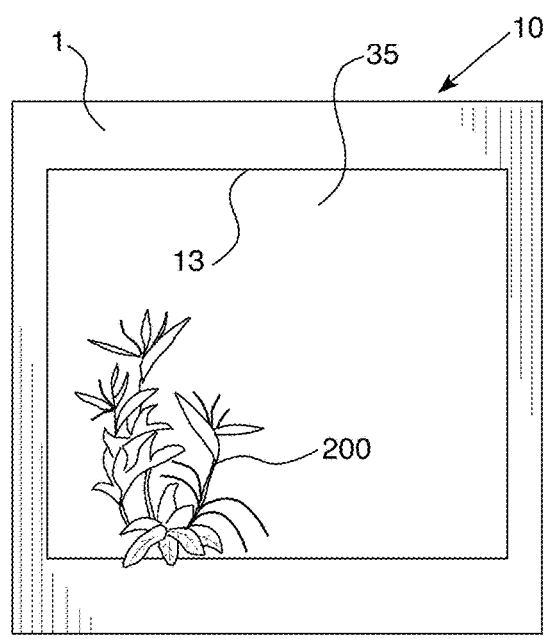
Figure 8C:
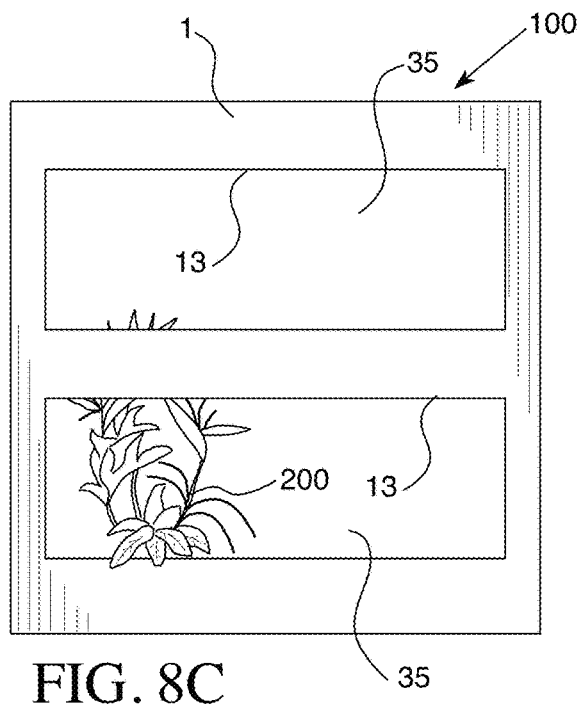

Front Face Insert 5. The various embodiments of a front face insert 5 of the present invention are designed to enables most of the structure and electronic components of the wall garden system 100 to be hidden even when the front exterior casing 1 is open. The front face insert 5, as shown in FIGS. 1 through 4B, sits on the front side of the structural frame 9 and wraps to the inside of the structural frame 9 to create a surface upon which various components of the wall garden system 100 attach. In the preferred embodiment, the front face insert 5 is a one-piece structure, but alternative embodiments can have a front face insert 5 comprised of multiple, connecting sections. The front face insert 5 also allows the plant trays 3 to be secured into the wall garden system 100. The various embodiments of the present invention have the front face insert 5 with any number of shelves 36 for supporting plant tray(s) 3. FIGS. 1 through 4B, 8A, 8C show wall garden systems 100 having two shelves 36 designed as part of the front face insert 5. FIG. 8B shows one shelf 36 designed as part of the front face insert 5. The various embodiments of the present invention can incorporate any number of shelves 36 so long as there is at least one shelf 36. The shelves 36 can be spaced equal distance from one another or they can have varied spacing to accommodate plants 200 of different sizes.

According to the various embodiments of the present invention, the front face insert 5 may have a variety of wall garden system components attached to it or the front face insert 5 may have openings to accommodate various components of the wall garden system 100. For example, as shown in FIGS. 1, 3 and 4A, one embodiment of the front face insert 5 accommodates the user interface 6. Additionally, various embodiments of the front face insert 5 can have openings to enable a user to view the water tank 12 water level (see FIGS. 1, 3, and 4A). In some embodiments of the present invention, the front face insert 5 can be designed to have at least one water fill inlet 10 for filling the water tanks 12 (see FIGS. 2 through FIG. 4A). As shown in FIGS. 1 and 15, some embodiments of the front face insert 5 are designed with at least one opening for the IR or other tray water level sensors 7 (see FIGS. 13C and 15). In the preferred embodiment of the present invention wall garden system 100, the front face insert 5 is configured to have at least one sump or groove 56 (shown in FIGS. 4A, 15A and 17). These sumps or grooves 56 mate with protrusions or foot or feet 59 on the tray(s) 3 to ensure the proper installation, alignment and orientation of the tray 3 with the front face insert 5 and with components of the water delivery system 8 and the tray water level sensor system 47. FIGS. 5C, 5D and 16 show one example of feet 59 on various trays 3. The grooves 56 and feet 59 are one example of mating structures that can be incorporated into the front face insert 5 and the trays 3 to ensure the proper alignment and orientation of the trays 3 in the front face insert 5. All analogous structures that can be designed by one skilled in the art are included within the scope of the present invention.

Figure 14A:
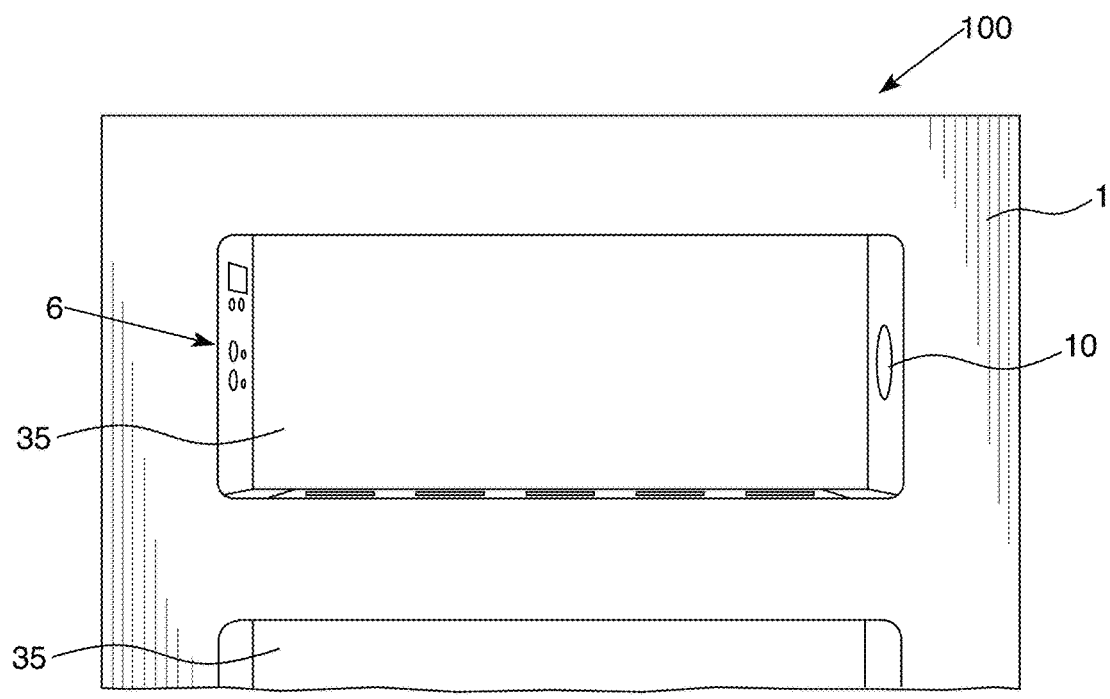
FIGS. 14A through 14B show alternate embodiments of the front exterior casing having the user interfaces and water inlets in different locations.
Figure 14B:
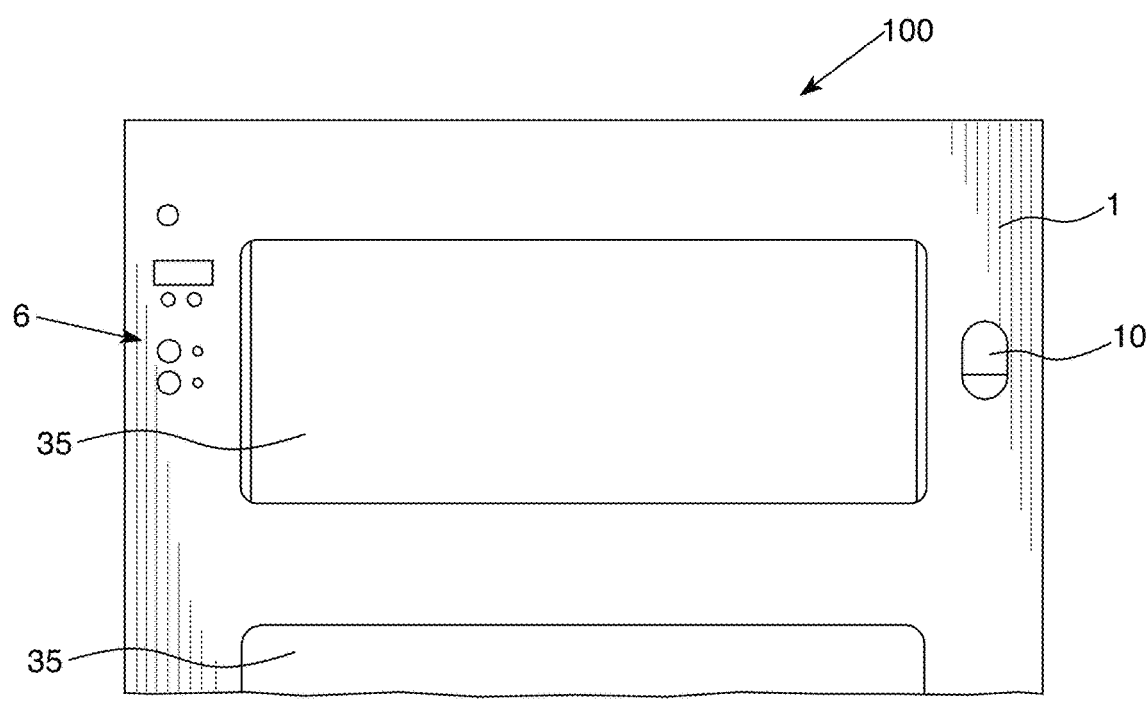

User Interface 6. The various embodiments of the present invention incorporate a user interface 6, which should be easily accessible to the user. The user interface 6 enables the user to control the settings for the wall garden system 100 and to obtain important information from the system. Among other options, the user interface 6 enables the user to select plant growth protocols for the top and bottom rows based on a variety of factors including: the types of plants 200 being grown, manual or setting automatic controls over the system grow lights 16 and watering function with features such as the "snooze", light dimming, watering time settings, light illumination alarm to wake the user up in the morning with light and other settings. On some embodiments, the user interface 6 can be placed on the front face insert 5 behind the front exterior casing 1 (see FIGS. 1, 3, 4A, 13A, and 13B) or in an alternate position on the device such as the inside of the front face insert 5 (see FIG. 14A). Alternatively, the user interface 6 may be placed directly on the front exterior casing 1 (see FIG. 14B).

The various embodiments of a user interface 6 can be designed with any capabilities needed for the associated embodiment of a wall garden system 100. Additionally, the various embodiments of a user interface 6 can be designed to incorporate capabilities unrelated to the wall garden system 100, such as connected to other electronic devices in the environment. Various embodiments of user interfaces 6 can have push bottoms, touchscreens, and/or an LED or LCD screen. In other embodiments, the wall garden system 100 may connect to and be controlled by an app or technology on an electronic device, mobile phone, home networking device, etc. (alone or in additional to a physical user interface 6 on the wall garden system 100, FIG. 1).

Grow Lights 16. The various embodiments of the wall garden system 100 include grow lights 16 that deliver lighting to the plants 200 at specific wavelengths and/or intensity for growth. In the preferred embodiment, the grow lights 16 are LED and have a temperature range of 3000-5000 K. However, a temperature range of 1,000K to 10,000K will work in various embodiments of the present invention. In the preferred embodiment, the grow lights 16 are electronically controlled to allow for variable light intensity to provide light across a spectrum of color temperature. The wall garden system 100 may contain one or more levels of grow lights 16, one for each row of plants (see FIGS. 1, 4A, 4B, 8A, and 8B).

One embodiment of the invention utilizes the ability of some grow lights 16 to dim, gradually illuminating the lights 16 to simulate sunrise in the morning and gradually dimming them to simulate sunset in the evening. This may be beneficial for plant growth and to help wake up users in a bedroom environment. In other embodiments, the grow lights 16 may change color, flash or modulate to indicate to the user that there is an error or an issue with the system or to convey any other type of information.

Figure 7:
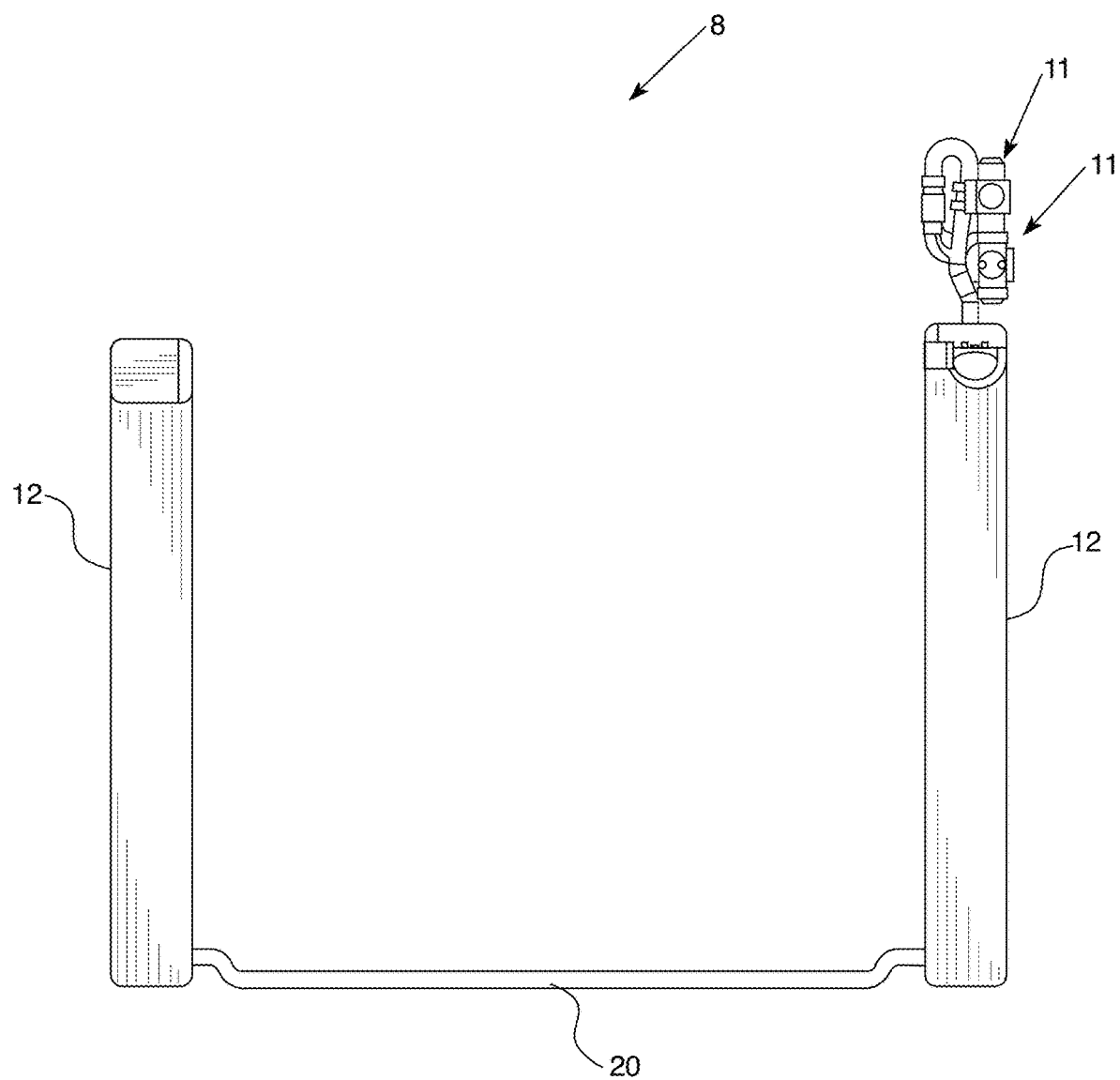
FIG. 7 illustrates one embodiment of a water delivery system for the present invention.

Water Delivery System 8. The preferred embodiment of the invention utilizes a water delivery system 8 consisting of one or more water tanks 12 to store water in the wall garden system 100, at least one water pump 19, solenoid valve(s) 11 (or another similar valve), an optional water inlet 10, and tubing 20 to connect the various parts of the water delivery system 8 (as shown in FIGS. 7 and 22A). The use of more than one tank 12 lessens the frequency with which the tanks 12 need to be refilled by the user. In the various embodiments of this invention, the tanks 12 can be connected to each other through tubing 20 or other means to share water and simplify water delivery to the plant trays 3. Alternatively, each tray 3 can have a dedicated tank 12. In one embodiment of the present invention, shown in FIG. 19, the water tank(s) 12 may have drainage ports 57 so water can be removed by the user when moving the wall garden system 100 or in the case of an issue (FIG. 1). In one embodiment, the water tank(s) 12 may have an overflow drain or valve to prevent accidental overfilling. The water delivery system 8 also incorporates one or more tray fill nozzles 51 for dispensing water into the tray(s) 3. Examples of tray fill nozzles 51 are shown in FIGS. 1 and 17. Finally, in some embodiments of the present invention, the front face insert 5 has a water inlet 10 through which the tanks 12 can be filled easily (see FIGS. 1, 3, and 4A).

The preferred embodiment of the invention utilizes an ultrasonic water system level sensor 21 that detects the water level in the water tank(s) 12 and sends a signal to a wall garden system processor or MCU 40 if the water level drops below a certain level. Alternatively, other sensor types may be utilized for water level sensing such as IR, electric conductivity switches, float switches, Hall Effect sensors, or others can be incorporated into the water delivery system 8, see FIG. 7.

Alternative embodiments of the present invention wall garden system 100 do not use any water tanks 12. Instead, for those embodiments, the water delivery system 8 is connected to plumbing in the surrounding environment to eliminate the need to refill the water in the wall garden system 100.

The various embodiments of this invention contain at least one water pump 19, which delivers water through tubing 20 to two solenoid valves 11, which regulate the flow for each plant tray 3 (see FIG. 7). Alternatively, if connected directly to the building plumbing or another pressurized water source, solenoids 11 may function independently and not require a pump 19.

Some embodiments may contain an added nutrient delivery module that will dose and deliver plant nutrients 24 into the water delivery system 8 and ultimately to the plant trays 3 at desired concentrations. Such embodiments would be incorporated into the water delivery system 8 illustrated in FIGS. 7, 10, and 22A.

The different components of the water delivery system 8 can be arranged and located in a variety of different ways and locations within the wall garden system 100 so long as they are designed to transport water to the trays 3 when the water level in the trays 3 is below a predetermined level. FIG. 22A illustrates an alternative embodiment of the present invention with tubing 20 running between the front face insert 5 and the back 55 of the wall garden system 100 and entering the trays 3 along their long sides 38. FIG. 22B shows one possible location for a Hall Effect sensor board 45 underneath one of the shelves 36. If this Hall Effect sensor board 45 detects the presence of a magnetic float 41 at the bottom 61 of the tray 3, then the Hall Effect sensor board 45 will signal a low water level to the MCU 40 which in turn will active the pump 19 in the water delivery system 8. This Hall Effect sensor board 45 is positioned to line up the Z-axis of the magnetic float 41.

Power Input/Source 15. The various embodiments of this invention require a power source 15 for the components of the wall garden system 100 to operate. This power source 15 may be from AC home outlet current (120 v or 240 v), DC current from DC power supply, DC battery, or other DC source such as a photovoltaic. Power delivery to the wall garden system 100 from these power sources 15 operates the electrical, sensor, lighting, and watering systems. FIG. 19 shows one possible location for a power cord housing 52 for embodiments configured for use with a power cord as a power input 15.

MCU 40. The various embodiments of this invention utilize a microprocessor or microcontroller unit (collectively "MCU 40") to control the system by collecting sensor (tray water level sensor 7, water system level sensor 21, temperature and humidity sensor(s) 28) and user interface 6 inputs to monitor and control lighting and irrigation systems, among other aspects of the invention (FIGS. 10 through 13). The MCU 40 collects this input data and, in turn, controls the various components and systems in the wall garden system 100, including, the grow lights 16, the water delivery system 8, and the tray water level sensor system 47 based upon sensor and user interface inputs. For example, the MCU 40 may collect data from the water system level sensor 21 and initiate the low water level indicator 29 when the water tank(s) 12 needs to be refilled by the user. The MCU 40 also can collect data from optional system leak sensors and initiate an audible or visible alarm signal if a leak is detected. The MCU 40 may control the grow lights 16 to change color or flash or modulate to signal to the user that a leak has been detected or that the water level in the water tank(s) 12 is reaching a low level. The MCU 40 also can connect to a local network or the internet through Wi-Fi, Bluetooth, other wireless communications protocol, or a physical wired connection in order to interact with a mobile application that can control the wall garden system 100 or communicate data and protocols with servers to help train plant growth machine learning models. The MCU 40 also can collect data from system temperature and humidity sensor(s) 28 and use this input to regulate pre-programmed watering schedules based on the environmental conditions. If connected to the internet, the MCU 40 may transmit additional data from sensors such as temperature, humidity, cameras, pH, electrical conductivity, and light meters to servers in order to gain a more complete understanding of environmental growing conditions and enable improvements in system control as well as the derivation of plant growth learnings by machine learning models. The MCU 40 can be located in any available space within the wall garden system 100. In the preferred embodiment, the MCU 40 is located behind the front face insert 5. However, depending upon the number of other components in any given wall garden system 100 (tanks 12, shelves 36, etc.) the MCU 40 can be in different locations behind the front face insert 5 in different wall garden systems 100.

System Leak Sensors. Some embodiments may contain leak sensors in areas prone to water leakage. Leak sensors will communicate to the MCU 40, which in turn will alert the user that a leak has occurred, preventing additional watering and further leaking (see generally FIGS. 10 through 12).

Temperature and Humidity Sensor(s) 28. Some embodiments of this invention may have temperature and humidity sensors 28 to collect data on the plant growing environment which can be sent to the MCU 40 and used to adjust watering, lighting or other controls or learn and improve plant growth in the wall garden system 100 (see FIGS. 8A through 8C and 12).

Low Water Indicator 29. In some embodiments of this invention a discrete indicator light or other indicator 29 can be used to notify the user when the water level is low in the tank(s) 12, and it needs to be refilled. Alternatively, this may be accomplished by flashing or modulating the grow lights 16 or by a separate indicator light 29 on the user interface 6 or a notification sent to a user's connected mobile device (see generally FIGS. 1, 3, 10 through 12).

Wireless Connectivity Modules 30. Some embodiments of this invention can be configured to have Wi-Fi, Bluetooth or near field communication ("NFC") modules to facilitate wireless communications with nearby mobile devices, remote servers or internet connected mobile devices. For example, Wi-Fi module may be used to connect a wall garden system 100 to the internet and maintain this connection to stream data from the wall garden system 100 to a cloud database or directly to the user through a mobile application. Bluetooth module to facilitate initial setup and internet connection and to link the wall garden system 100 to a specific user account. Bluetooth may also be used to directly control a wall garden system 100 from a nearby mobile phone application. In other embodiments, an NFC module may be used to facilitate initial internet connection and linking the wall garden system 100 to a specific user account.

Memory Card. Some embodiments of the wall garden system 100 system may have local storage of data on a permanent or removable memory card or solid-state drive ("SSD"), this helps store and buffer data in case of loss of internet connection. It may also be desirable for data to be stored on a memory card and then sent to the cloud in batches, rather than streamed directly from a sensor to the cloud.

Cameras 32. In some embodiments, the invention may have one or more cameras 32 facing each plant tray 3. These cameras 32 can be incorporated into the system to provide photo data to the user or to servers. This photo data may be used to train a series of machine learning models which will include but not be limited to image regression, image classification, image classification and localization, object detection, instance segmentation, and semantic segmentation models. For example, cameras 32 may be used to detect seed type being input into the system by the user by recognizing unique patterns or quick response ("QR") codes on the top of the growth media 23 package or pot or label. Cameras 32 may be used to collect images that when processed by local MCU 40 or servers could detect nutrient deficiencies or imbalances in plants, pests, plant water saturation levels, growth rate, plant maturity, estimated time to harvest, verification of sufficient growth lighting, or other important plant growth metrics. Once processed, this data may be relayed back to the user through a mobile application or through the built-in user interface 6 (see generally FIG. 12).

Photodetection Sensor(s). One embodiment of the present invention wall garden system 100 also incorporates at least one photodetection sensor. A photodetector sensor can be placed on the front exterior casing 1 to measure and characterize ambient light. This light data can be used to optimize light intensity and color profiles of the grow lights 16 for optimal plant growth and overall system power use (see generally FIG. 12).

Plant Growing System 26. To grow plants 200 in the present invention trays 3 and wall garden system 100, some combination of the following elements are used: seedlings or seeds 22, growth media 23, plant nutrients 24, and/or a growth cup 25 (see FIG. 9). The phrase "plant growing system 26" is used herein to collectively refer to all or any number of those elements. For example, some embodiments may utilize a plant growing system 26 that only incorporates seeds 22 and a growth media 23. In other embodiments of this invention, the plant growing system 26 may include only the growth media 23, plant seeds 22 and slow-release plant nutrients 24. For a third embodiment, the plant growing system 26 can be a seedling.

Figure 9:
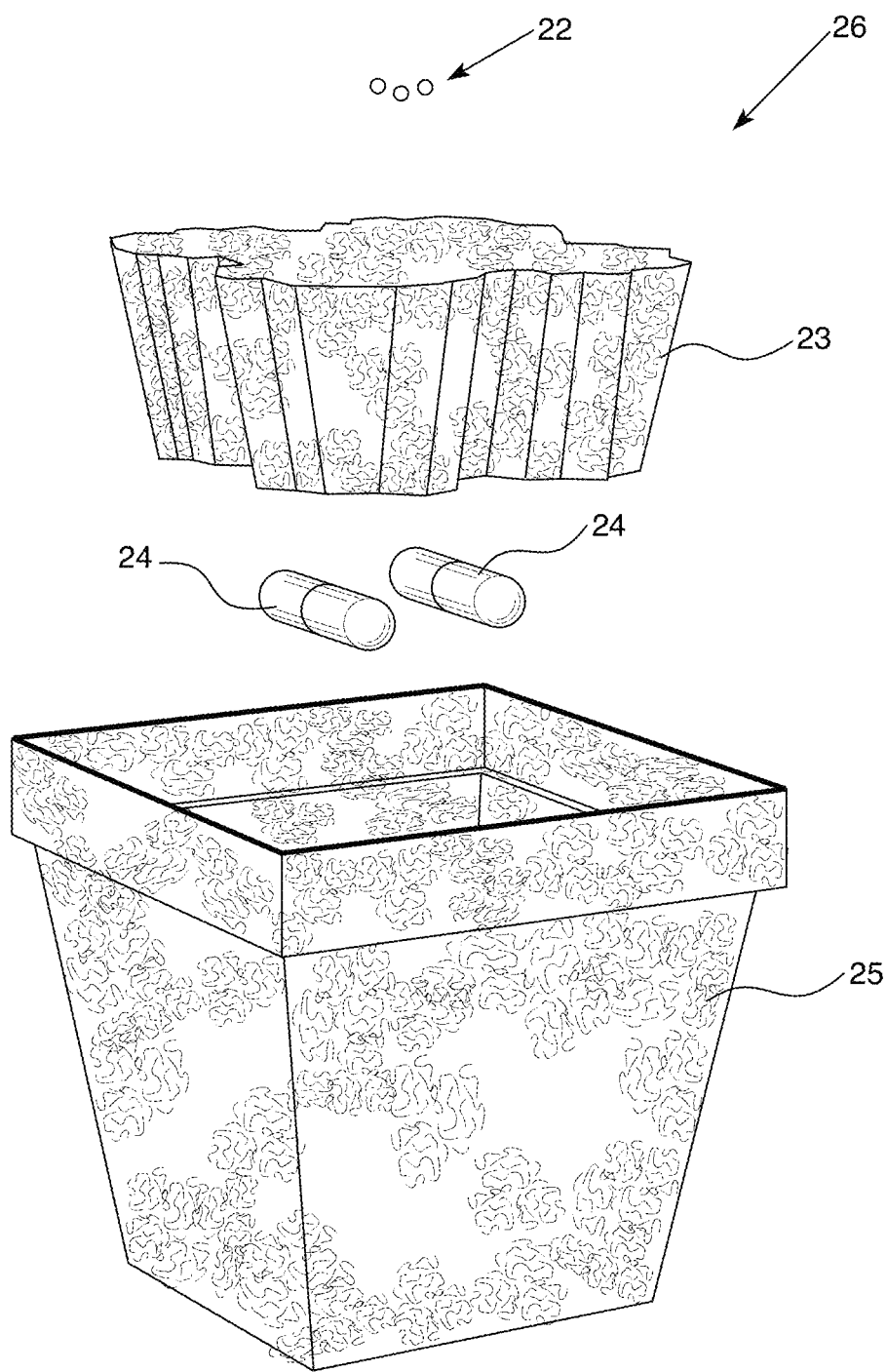
FIG. 9 shows one embodiment of a plant growing system, including seeds, growth media, plant nutrients and a growth cup according to the present invention.

The grown media 23 can be soil-based, non-soil based or a combination of both. Some of the embodiments of the invention described utilize a water absorbent growth media 23 that contains absorbent fibers. In some embodiments of the present invention, the growth media 23 individually, or the entire plant growing system 26, helps to water and feed the plant 200 as its roots develop and grow. In the preferred embodiment, the growth media 23 and an optional growth cup 25 are designed to be fully compostable for sustainable disposal after use (FIG. 9). In the preferred embodiment, the growth media 23 is soilless with a biodegradable binder that holds the media 23 together such that it does not create a mess when being introduced and removed from the wall garden system 100 (FIG. 9).

Other embodiments of the invention comprise the physical, electrical and computer software elements described herein, but instead of inserting a pre-formed plant growing system 26 into the trays 22, plants or seedlings can be planted directly in the trays 22 and work within the various structures of the present invention.

Most embodiments of this invention benefit from some form of plant nutrients 24 to facilitate optimal growth of the plants 200. There are several possible methods for plant nutrient 24 integration and a wide variety of nutrient sources 24 can be used with the present invention. The preferred method is for the plant nutrients 24 to be incorporated into the growth media 23 in a solid slow-release capsule format (as shown in FIG. 9). Alternatively, plant nutrients 24 can be introduced into the wall garden system 100 by directly adding a liquid solution into a water tank 12 or the plant tray 3 during (re)filling. In another embodiment, plant nutrients 24 can be placed into designated nutrient reservoirs then subsequently dosed into the plant trays 3. In another embodiment, concentrated plant nutrient 24 solution tanks may be filled by the customer that will drip, syphon or dispense into the water tank(s) 12 or plant trays 3.

Most embodiments of this invention utilize plant seeds 22, which may be seeds 22 for greens, microgreens, herbs, fruits, vegetables, ferns, succulents, flowers, grasses, spices, teas, cannabis or any other plants that can be introduced to the wall garden system 100 within the growth media 23 (FIG. 9). The present invention also works with seedlings instead of seeds 22.

Wall Mount Mechanism 33. For most embodiments of this invention, the wall garden system 100 is mounted on a wall 50 with the aid of a wall mount mechanism 33, which attaches to the rear of the wall garden system 100 (FIG. 6D). This can be a custom wall mount bracket or a standard wall mount such as a TV wall mount or similar mount for hanging heavy objects on a wall 300. In most embodiments, the wall mount mechanism 53 consists of two main components—at least one wall mount 53 that is designed to be mounted to the wall 300 and at least one bracket 50 that is attached to the back 55 of the wall garden system 100 and attaches to the wall mount 53, allowing for easy but secure attachment and removal of the wall garden system 100 from the wall 300. Alternatively, the wall garden system 100 may be installed directly into a cut-out in a wall 300 in a semi-recessed or fully-recessed manner with electricity and, in some cases, water lines, connected directly from the back (FIGS. 6A, 6B, 21A and 21B).

While not the preferred embodiment of the present invention, it will be obvious to one skilled in the art that the novel components of the present invention wall garden system 100 can be incorporated into a stand-alone garden that can be set on the floor, table or flat surface with appropriate support structures. All such variations are included within the scope of the present invention.

The present invention also encompasses a system for providing the appropriate light, nutrient and water conditions for plants growing in a wall-mounted garden system. This is accomplished through electro-mechanical control systems and utilizes logic as described in the following paragraphs.

Figure 10:
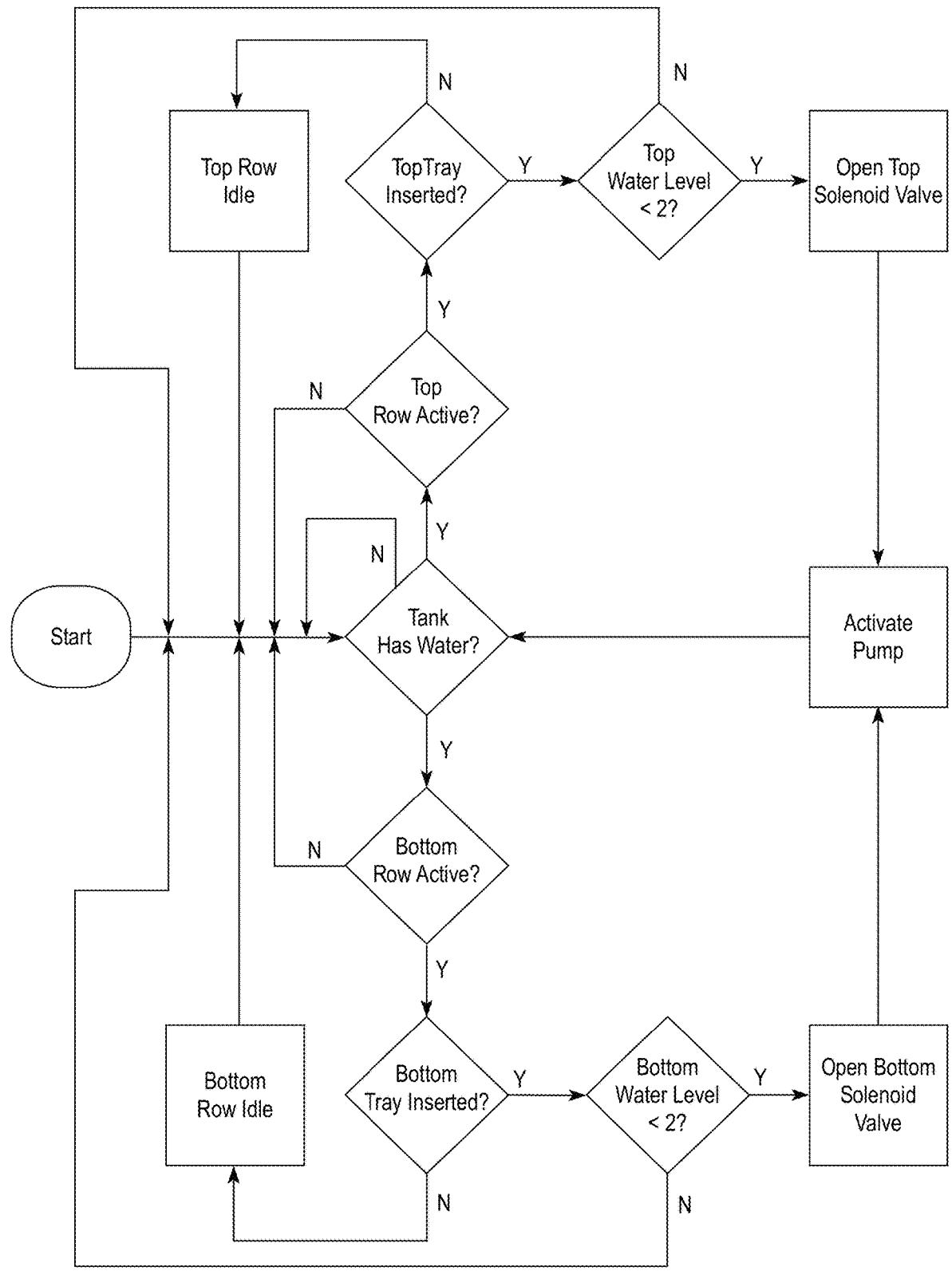
FIG. 10 illustrates a water delivery logic flowchart according to one embodiment of the present invention.

Water Delivery Logic (FIG. 10). The flowchart diagram shown in FIG. 10 describes the logic used within the wall garden system 100 to deliver water to the plant growing trays 3. In the preferred embodiment, this is one of the most critical systems within the wall garden system 100 as it enables autonomous watering, and nutrient delivery to the plants 200 in the wall garden system 100. Square boxes in this diagram shown in FIG. 10 represent states of the water delivery system 8, which can be activated based on the logic described in the diamond-shaped boxes. The "idle" state is a state in which the corresponding plant growing tray 3 is removed from the system, and so water will never be delivered to that tray 100. To deliver water to a specific tray 3, the system must: 1) ensure there is water in the tanks 12; 2) ensure that tray 3 is placed in an "active" state where that tray 3 is expected to be filled with water; ensure that tray 3 is correctly inserted in the system; and 4) check whether the water level is too low. If all these conditions are true, water will be delivered to that tray 3 by opening the corresponding solenoid valve 11 and activating the pump 19.

Figure 11:
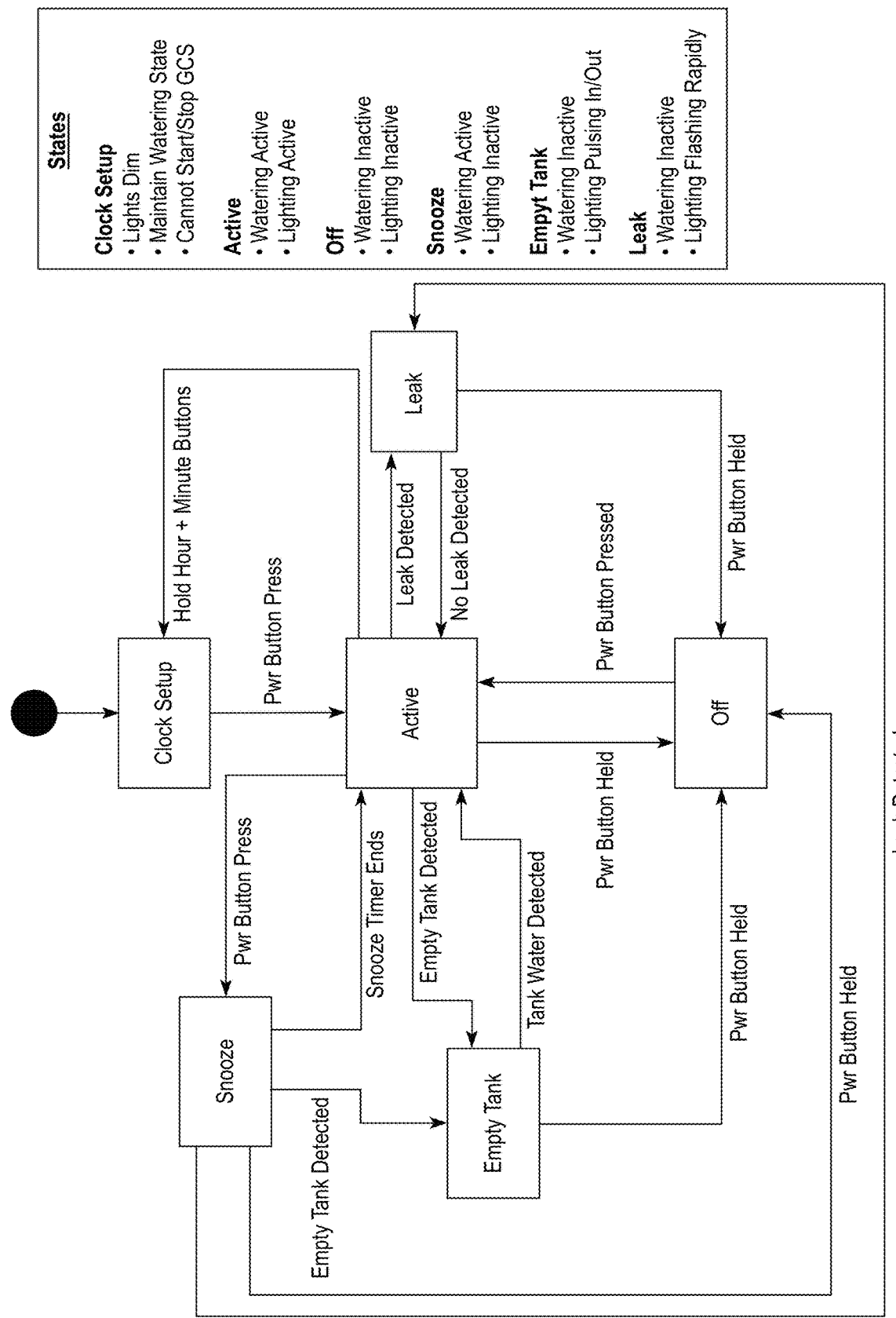
FIG. 11 illustrates a system state diagram according to one embodiment of the present invention.

System State Diagram (FIG. 11). The diagram in FIG. 11 describes the different states the wall garden system 100 can embody based on user inputs for certain embodiments of the present invention. The different states are described in a legend on the right side of this diagram and explain what functionalities are enabled or disabled when the wall garden system 100 is in a particular state. When initially connected to power, the wall garden system 100 can begin in the "Clock Setup" state, in which the time must be set. No other actions are allowed within this state. User inputs by means of pressing buttons allows the wall garden system 100 to transition between states. These transitions are also described within the diagram in FIG. 11. An alternate embodiment may utilize automatic time setting by using a radio-controlled clock or retrieve the current time once connected to the internet or a mobile device as described in wireless connectivity modules 30.

Figure 12:
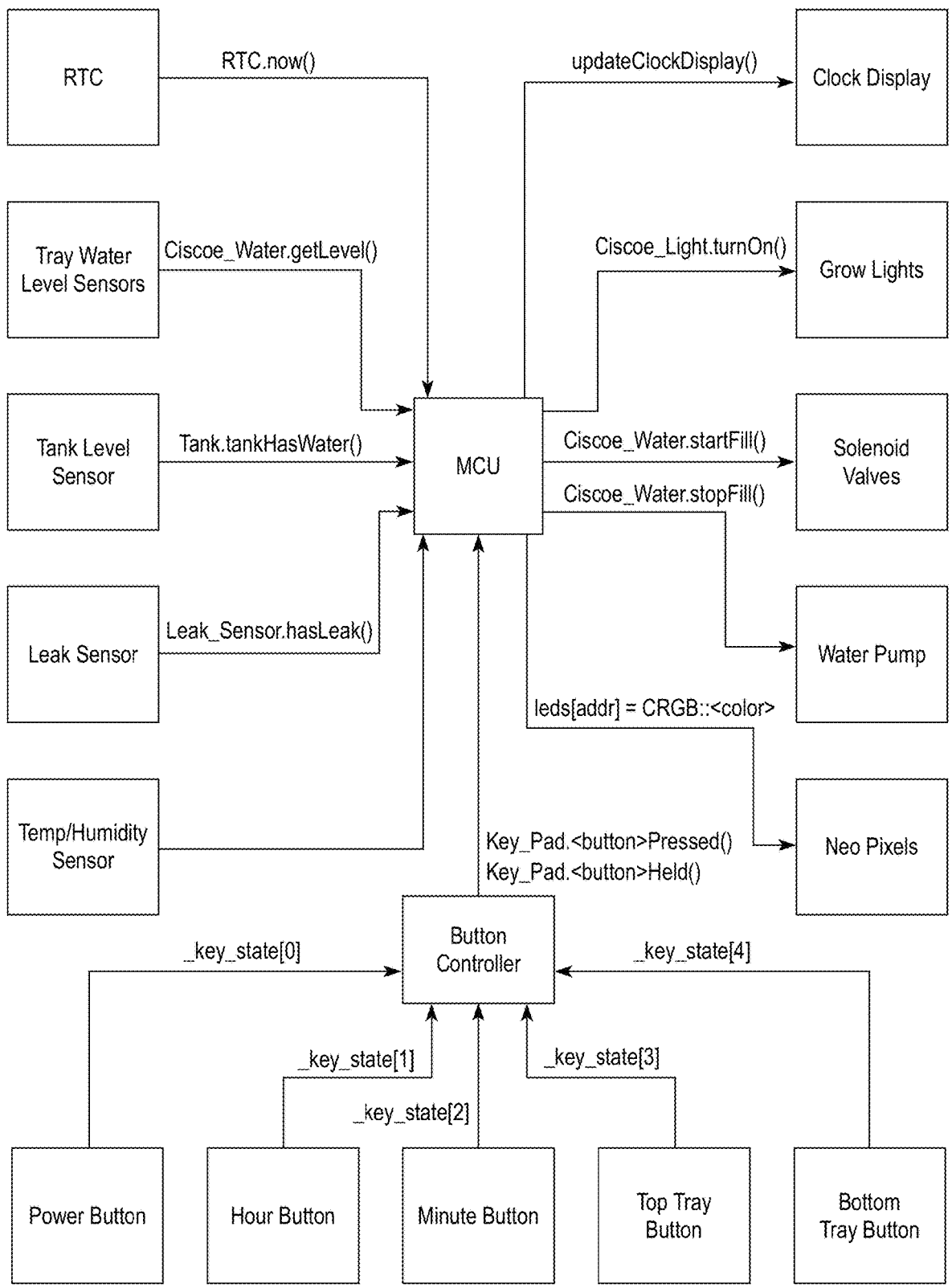
FIG. 12 illustrates an electrical circuit logic diagram according to one embodiment of the present invention.

Electrical Circuit Logic (FIG. 12). The diagram in FIG. 12 describes the electronic components at a high level and how these different components interface with one another in some embodiments of the present invention. At the center of the diagram is the microcontroller or MCU 40, which handles most of the logic and control of the system. The other boxes are electronic parts that communicate with this MCU 40 in some way. Arrows pointing to the MCU 40 describe inputs to the MCU 40 that allow the MCU 40 to make different decisions, while arrows pointing away from the MCU 40 describe parts that the MCU 40 directly controls because of combinations of inputs. The text on any arrow is a simple reference to the firmware abstraction for the interface between any two parts.

Finally, alternative embodiments of the present invention are a variety of methods of growing plant(s) 200 in a wall garden system 100 of the various embodiments described herein using and incorporating at least certain aspects and combinations of the water delivery logic detailed in FIG. 10, the system state diagram detailed in FIG. 11 and the electrical circuit logic detailed in FIG. 12. The various methods of the preset invention include the steps of assembling or acquiring a plant growing system 26, placing the plant growing system 26 into a tray 3 of the present invention, inserting the tray 3 into a wall garden system 100 of the present invention, providing or dispensing water to the inserted tray 3 by utilizing an embodiment of a tray water level sensor system 47 and an embodiment of a water delivery system 8, and monitoring the growth environment by utilizing one or more of the following sensors: a tray water level sensor 7, a temperature sensor, a humidity sensor, a photodetection sensor, and a leak sensor. The various methods of the present invention also incorporate having a user enter information and instructions into a wall garden system 100 using a user interface 6 or another connected technology to control and modify the growth environment. For example, the user can program the wall garden system 100 to turn on and off grow lights 16 at set times or according to light reading from environment in which the wall garden system 100 is installed.

The present invention also encompasses a method of growing a plant 200 in a wall garden system 100 that comprises combining a seedling or seeds 22 and a growth media 23 in a growth cup 25 and, optionally, including plant nutrients 24 with the seeds 22 and growth media 23. Then the growth cup 25 is placed in an embodiment of a plant tray 3 according to this invention. The plant tray 3 then can be watered and exposed to light or it can be placed within a wall garden system 100 of the present invention, which will provide water and light to the plant 200.

The present invention also includes a method for delivering water to one or more plants 200 in a wall garden system 100. This method is outlined in FIG. 10. One embodiment of this method of delivering water entails ascertaining the current state of a water delivery system 8 of the present invention. If the state of the water delivery system 8 is "idle" because a plant tray 3 has been removed from the system, then the method includes not delivering water to that tray. 3. If tray(s) 3 are in the system 100, then the method entails: 1) ensuring there is water in the tanks 12; 2) ensuring that tray(s) 3 is placed in an "active" state where that tray 3 is expected to be filled with water; 3) ensuring that tray 3 is correctly inserted in the system 100; and 4) checking whether the water level is too low. If all these conditions are true, then the method entails delivering water to that tray 3 by opening the corresponding solenoid valve 11 and activating the pump 19.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover all modifications and variations of this disclosure provided they come within the scope of the appended claims and their equivalents. Among other things, the following invention may be embodied as methods or devices. The detailed descriptions of the various embodiments of the present invention should not be taken in a limiting sense.

What is claimed is:

1. A wall garden system comprising:
    a structural frame configured to provide structure and support for the wall garden system;
    a front face insert that attaches within the structural frame;
    at least one shelf which is attached to or incorporated into the front face insert;
    at least one plant tray configured to sit on the at least one shelf and within the front face insert and further configured to hold an at least one plant growing system and an amount of water;
    at least one tray water level sensor system configured to measure the amount of water in the at least one tray;
    a water delivery system configured to deliver water to the at least one tray;
    a microprocessor or microcontroller unit to control the at least one tray water level sensor system and the water delivery system; and
    a power source,
    wherein a bottom of each plant tray is configured to have at least one plant tray foot; and
    wherein each shelf is configured to have a groove that mates with the plant tray foot to ensure the proper alignment of the tray on the shelf.

2. The wall garden system of claim 1, further comprising a front exterior casing configured to movably attach to and to cover the front face insert, and wherein the front exterior casing incorporates an at least one plant window.

3. The wall garden system of claim 2, wherein the exterior front casing incorporates at least one movable casing section.

4. The wall garden system of claim 2, further comprising at least one lip that extends from the at least one plant window.

5. The wall garden system of claim 1, further comprising one or more side exterior casings that are configured to conceal any exposed structural frame on an installed wall garden system.

6. The wall garden system of claim 1,
    wherein the at least one plant tray water level sensor system comprises:
        a transparent window incorporated into a side of the tray; and
        an infrared sensor configured to detect and measure the amount of the water in the tray through the transparent window.

7. The wall garden system of claim 1,
    wherein the at least one plant tray water level sensor system comprises:
        a float containing a magnet and confined within a float channel, which is attached to a bottom of the at least one plant tray; and
        a Hall Effect sensor on top of or incorporated into the at least one shelf and configured to identify the proximity of the magnet to the Hall Effect sensor.

8. The wall garden system of claim 1, further comprising a plant tray lid for each of the at least one plant trays, wherein each plant tray lid has at least one plant tray opening through which a plant can grow.

9. The wall garden system of claim 1, wherein the water delivery system comprises:
    at least one water tank;
    a pump to move water within the water delivery system and to the plant trays;
    at least one valve through which the water moves within the system;
    tubing to connect the at least one water tanks to any additional water tanks; and
    at least one tray fill nozzle that is configured to dispense water into the at least one plant tray.

10. The wall garden system of claim 1, further comprising at least one grow light incorporated into the front face insert and located above the at least one plant tray.

11. The wall garden system of claim 1, further comprising a user interface.

12. The wall garden system of claim 1, further comprising a wall mount mechanism configured to attach the wall garden system to a wall.

13. The wall garden system of claim 1, further comprising at least one sensor selected from the group consisting of a temperature sensor and a humidity sensor.

14. The plant tray assembly of claim 1, further comprising at least one camera.

* * * * *